United States Patent
Alphin, III et al.

(10) Patent No.: US 10,627,995 B2
(45) Date of Patent: Apr. 21, 2020

(54) COLLECTION AND CONTROL OF USER ACTIVITY SET DATA AND ACTIVITY SET USER INTERFACE

(71) Applicant: Microsoft Technology Licensing, LLC, Redmond, WA (US)

(72) Inventors: Thomas H. Alphin, III, Kirkland, WA (US); Kenneth Lynn Crocker, Sammamish, WA (US); Brian R. Meyers, Issaquah, WA (US); Michael J. Novak, Redmond, WA (US); Valerie Louise Wang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 37 days.

(21) Appl. No.: 15/662,057

(22) Filed: Jul. 27, 2017

(65) Prior Publication Data
US 2018/0284959 A1   Oct. 4, 2018

Related U.S. Application Data

(60) Provisional application No. 62/478,536, filed on Mar. 29, 2017.

(51) Int. Cl.
*G06F 3/0482*     (2013.01)
*G06F 16/22*      (2019.01)
(Continued)

(52) U.S. Cl.
CPC .......... *G06F 3/0482* (2013.01); *G06F 3/0486* (2013.01); *G06F 11/3438* (2013.01);
(Continued)

(58) Field of Classification Search
CPC .. G06F 3/0482; G06F 3/0486; G06F 16/2228; G06F 11/3438; H04L 67/22; H04L 67/24; G06Q 10/109
See application file for complete search history.

(56) References Cited

U.S. PATENT DOCUMENTS 5,463,774 A   10/1995  Jenness
5,943,496 A    8/1999  Li et al.
(Continued)

FOREIGN PATENT DOCUMENTS

EP   1155366    11/2001
EP   2608041     6/2013
(Continued)

OTHER PUBLICATIONS

"Add Rich Card Attachments to Messages", Retrieved from https://docs.microsoft.com/en-us/azure/bot-service/nodejs/bot-builder-nodejs-send-rich-cards?view=azure-bot-service-3.0, Jun. 6, 2017, 8 Pages.
(Continued)

*Primary Examiner* — Charles E Anya
(74) *Attorney, Agent, or Firm* — NovoTechIP International PLLC

(57) ABSTRACT

Techniques are described for creating and modifying task records and for controlling information displayed to a user in corresponding task representations. The task records are associated with more or more user activities, where each activity is associated with a record having an identifier for the activity, an application identifier that indicates a software application associated with the activity, and a content identifier identifying content associated with the software application and the activity. The activity records can include activation information. A user can select a task representation and resume one or more activities associated with the task. Tasks records can be shared between different computer devices of the user, and with different users. Task and activity records can be associated with navigational mnemonics. Representations of task and activity records can be displayed proximate representations of associated navigational mnemonics to help a user locate tasks and activities of interest.

13 Claims, 16 Drawing Sheets

(51) Int. Cl.
- *G06Q 10/10* (2012.01)
- *G06F 11/34* (2006.01)
- *G06F 3/0486* (2013.01)
- *H04L 29/08* (2006.01)

(52) U.S. Cl.
CPC ....... *G06F 16/2228* (2019.01); *G06Q 10/109* (2013.01); *H04L 67/22* (2013.01); *H04L 67/24* (2013.01)

(56) References Cited

U.S. PATENT DOCUMENTS

| | | |
|---|---|---|
| 6,018,743 A | 1/2000 | Xu |
| 6,044,374 A | 3/2000 | Nesamoney et al. |
| 6,085,205 A | 7/2000 | Peairs et al. |
| 6,093,216 A | 7/2000 | Adl-Tabatabai et al. |
| 6,253,252 B1 | 6/2001 | Schofield |
| 6,697,877 B1 | 2/2004 | Martin et al. |
| 6,772,216 B1 | 8/2004 | Ankireddipally et al. |
| 6,826,760 B1 | 11/2004 | Hunt et al. |
| 6,957,395 B1 | 10/2005 | Jobs et al. |
| 6,993,723 B1 | 1/2006 | Danielsen et al. |
| 7,051,042 B2 | 5/2006 | Krishnaprasad et al. |
| 7,802,205 B2 | 9/2010 | Bedingfield |
| 7,970,240 B1 | 6/2011 | Chao et al. |
| 8,020,111 B2 | 9/2011 | Horvitz et al. |
| 8,037,046 B2 | 10/2011 | Udezue et al. |
| 8,065,732 B1 | 11/2011 | Ward et al. |
| 8,353,012 B2 | 1/2013 | Del Real |
| 8,364,514 B2 | 1/2013 | Macbeth et al. |
| 8,612,435 B2 | 12/2013 | Sambrani et al. |
| 8,782,218 B1 | 7/2014 | Graham et al. |
| 8,789,014 B2 | 7/2014 | Robison et al. |
| 9,054,919 B2 | 6/2015 | Kiang et al. |
| 9,100,337 B1 | 8/2015 | Battre et al. |
| 9,125,015 B2 | 9/2015 | Pennanen et al. |
| 9,191,355 B2 | 11/2015 | Yerli |
| 9,230,027 B2 | 1/2016 | Greene |
| 9,288,175 B2 | 3/2016 | Eisenberg et al. |
| 9,317,390 B2 | 4/2016 | Chisa et al. |
| 9,342,209 B1 | 5/2016 | Hwang et al. |
| 9,363,634 B1 | 6/2016 | Kirmse et al. |
| 9,779,063 B1 | 10/2017 | Dykema |
| 9,824,363 B1 | 11/2017 | Wang et al. |
| 10,025,702 B1 | 7/2018 | Novak et al. |
| 2002/0174134 A1 | 11/2002 | Goykhman |
| 2004/0103426 A1 | 5/2004 | Ludvig et al. |
| 2004/0133848 A1 | 7/2004 | Hunt et al. |
| 2004/0220946 A1 | 11/2004 | Krishnaprasad et al. |
| 2005/0044089 A1 | 2/2005 | Wu et al. |
| 2005/0234986 A1 | 10/2005 | Terek et al. |
| 2005/0235206 A1 | 10/2005 | Arend et al. |
| 2006/0004705 A1 | 1/2006 | Horvitz et al. |
| 2006/0036935 A1 | 2/2006 | Warner et al. |
| 2006/0074732 A1 | 4/2006 | Shukla et al. |
| 2006/0155723 A1 | 7/2006 | Kumar et al. |
| 2006/0190440 A1 | 8/2006 | Horvitz et al. |
| 2006/0224583 A1 | 10/2006 | Fikes et al. |
| 2006/0288041 A1 | 12/2006 | Plastina et al. |
| 2007/0016553 A1 | 1/2007 | Dumais et al. |
| 2007/0143123 A1 | 6/2007 | Goldberg et al. |
| 2007/0211871 A1 | 9/2007 | Sjolander et al. |
| 2007/0297590 A1 | 12/2007 | Macbeth et al. |
| 2007/0299631 A1 | 12/2007 | Macbeth et al. |
| 2007/0299795 A1 | 12/2007 | Macbeth et al. |
| 2007/0299796 A1 | 12/2007 | Macbeth et al. |
| 2007/0300174 A1 | 12/2007 | Macbeth et al. |
| 2008/0046218 A1 | 2/2008 | Dontcheva et al. |
| 2008/0049714 A1 | 2/2008 | Commarford et al. |
| 2008/0127108 A1 | 5/2008 | Ivanov et al. |
| 2008/0127109 A1 | 5/2008 | Simeon |
| 2008/0133287 A1 | 6/2008 | Slattery |
| 2008/0276179 A1 | 11/2008 | Borenstein et al. |
| 2008/0300055 A1 | 12/2008 | Lutnick et al. |
| 2008/0313227 A1 | 12/2008 | Shafton et al. |
| 2009/0043646 A1 | 2/2009 | Pingali et al. |
| 2009/0150423 A1 | 6/2009 | Spanton et al. |
| 2009/0228427 A1 | 9/2009 | Friesenhahn et al. |
| 2009/0241048 A1 | 9/2009 | Augustine et al. |
| 2009/0319472 A1 | 12/2009 | Jain et al. |
| 2010/0058172 A1 | 3/2010 | Soldan et al. |
| 2010/0070527 A1 | 3/2010 | Chen |
| 2010/0235306 A1 | 9/2010 | Wagoner |
| 2010/0250322 A1 | 9/2010 | Norwood |
| 2011/0040990 A1 | 2/2011 | Chan et al. |
| 2011/0126050 A1 | 5/2011 | Begole et al. |
| 2011/0173525 A1 | 7/2011 | Mukhopadhyay et al. |
| 2011/0191303 A1 | 8/2011 | Kaufman et al. |
| 2011/0289117 A1 | 11/2011 | Agrawal et al. |
| 2012/0084248 A1 | 4/2012 | Gavrilescu |
| 2012/0143923 A1 | 6/2012 | Whitney et al. |
| 2012/0144416 A1 | 6/2012 | Wetzer et al. |
| 2012/0159515 A1 | 6/2012 | Calderon et al. |
| 2012/0159564 A1 | 6/2012 | Spektor et al. |
| 2012/0246344 A1 | 9/2012 | Vargas et al. |
| 2012/0254100 A1 | 10/2012 | Grokop et al. |
| 2012/0271867 A1 | 10/2012 | Grossman et al. |
| 2012/0272230 A1 | 10/2012 | Lee |
| 2012/0303425 A1 | 11/2012 | Katzin et al. |
| 2012/0311447 A1 | 12/2012 | Chisa et al. |
| 2012/0331408 A1* | 12/2012 | Ainslie ................. G06F 16/954 715/760 |
| 2013/0013560 A1 | 1/2013 | Goldberg et al. |
| 2013/0013642 A1 | 1/2013 | Klein et al. |
| 2013/0013689 A1 | 1/2013 | Crawford |
| 2013/0067346 A1 | 3/2013 | Rosenstein et al. |
| 2013/0073389 A1 | 3/2013 | Heath |
| 2013/0080266 A1 | 3/2013 | Molyneux et al. |
| 2013/0080641 A1 | 3/2013 | Lui et al. |
| 2013/0103699 A1 | 4/2013 | Perantatos et al. |
| 2013/0110623 A1 | 5/2013 | Kilroy et al. |
| 2013/0110894 A1 | 5/2013 | Beaverson et al. |
| 2013/0139113 A1 | 5/2013 | Choudhary et al. |
| 2013/0262439 A1* | 10/2013 | Hao ....................... G06F 16/58 707/722 |
| 2013/0263289 A1 | 10/2013 | Vijayan et al. |
| 2013/0275509 A1 | 10/2013 | Micucci et al. |
| 2013/0275994 A1 | 10/2013 | Uola et al. |
| 2013/0346482 A1 | 12/2013 | Holmes |
| 2013/0347078 A1 | 12/2013 | Agarwal et al. |
| 2014/0012574 A1 | 1/2014 | Pasupalak et al. |
| 2014/0033291 A1 | 1/2014 | Liu |
| 2014/0068443 A1 | 3/2014 | Eng et al. |
| 2014/0089512 A1 | 3/2014 | Zhao et al. |
| 2014/0095624 A1 | 4/2014 | Quan |
| 2014/0098127 A1 | 4/2014 | Fein et al. |
| 2014/0108585 A1* | 4/2014 | Barton ............. H04N 21/85403 709/213 |
| 2014/0122697 A1 | 5/2014 | Liu et al. |
| 2014/0162793 A1 | 6/2014 | Quan et al. |
| 2014/0207962 A1 | 7/2014 | Makofsky |
| 2014/0229391 A1 | 8/2014 | East et al. |
| 2014/0325070 A1 | 10/2014 | Philip et al. |
| 2014/0337339 A1 | 11/2014 | Li |
| 2015/0004998 A1 | 1/2015 | Pennanen et al. |
| 2015/0081633 A1 | 3/2015 | Su et al. |
| 2015/0128162 A1 | 5/2015 | Ionescu |
| 2015/0163530 A1* | 6/2015 | Bayer ............. H04N 21/25891 725/9 |
| 2015/0235258 A1 | 8/2015 | Shah et al. |
| 2015/0235275 A1 | 8/2015 | Shah et al. |
| 2015/0256423 A1 | 9/2015 | Stearns |
| 2015/0286694 A1 | 10/2015 | Kaplinger et al. |
| 2015/0294634 A1 | 10/2015 | Jung et al. |
| 2015/0339374 A1 | 11/2015 | Smarr et al. |
| 2015/0350106 A1 | 12/2015 | Whalley et al. |
| 2015/0365453 A1* | 12/2015 | Cheng ................. H04L 65/4092 709/219 |
| 2015/0370765 A1 | 12/2015 | Kim et al. |
| 2016/0092107 A1 | 3/2016 | Bruner et al. |
| 2016/0162370 A1 | 6/2016 | Mehta et al. |
| 2016/0261709 A1 | 9/2016 | Sacks et al. |
| 2016/0294916 A1 | 10/2016 | Daher et al. |
| 2016/0302166 A1 | 10/2016 | Dang et al. |

(56) References Cited

U.S. PATENT DOCUMENTS

| | | | |
|---|---|---|---|
| 2016/0352846 | A9 | 12/2016 | Gauglitz et al. |
| 2017/0017638 | A1 | 1/2017 | Satyavarta et al. |
| 2017/0094635 | A1 | 3/2017 | Liu et al. |
| 2017/0169403 | A1 | 6/2017 | Zhang |
| 2017/0222865 | A1* | 8/2017 | Koorapati ............. G06F 16/182 |
| 2017/0336960 | A1 | 11/2017 | Chaudhri et al. |
| 2019/0050378 | A1 | 2/2019 | Novak et al. |
| 2019/0050440 | A1 | 2/2019 | Novak et al. |

FOREIGN PATENT DOCUMENTS

| | | |
|---|---|---|
| EP | 2851857 | 3/2015 |
| WO | WO 2005/072191 | 8/2005 |
| WO | 2008021478 A2 | 2/2008 |
| WO | WO 2013/192564 | 12/2013 |
| WO | WO 2014/102698 | 7/2014 |

OTHER PUBLICATIONS

"Applet", Retrieved from https://en.wikipedia.org/wiki/Applet :, Retrieved on Nov. 15, 2017, 4 Pages.

"Comparison of Data Serialization Formats", Retrieved from https://en.wikipedia.org/wiki/Comparison_of_data_serialization_formats, Retrieved on Nov. 1, 2017, 11 Pages.

"DataPackage Class", Retrieved from https://docs.microsoft.com/en-us/uwp/api/windows.applicationmodel.datatransfer.datapackage, Retrieved on Nov. 27, 2017, 19 Pages.

"DataPackagePropertySet Class", Retrieved from https://docs.microsoft.com/en-us/uwp/api/windows.applicationmodel.datatransfer.datapackagepropertyset, Retrieved on Nov. 27, 2017, 16 Pages.

"Document File Format", Retrieved from https://en.wikipedia.org/wiki/Document_file_format, Retrieved on Nov. 27, 2017, 3 Pages.

"Hresult", Retrieved from https://en.wikipedia.org/wiki/HRESULT, Retrieved on Nov. 1, 2017, 3 Pages.

"How to: Add Data to the Clipboard", Retrieved from https://docs.microsoft.com/en-us/dotnet/framework/winforms/advanced/how-to-add-data-to-the-clipboard, Mar. 30, 2017, 5 Pages.

"HString Class", Retrieved from https://msdn.microsoft.com/en-us/library/hh771141.aspx, Retrieved on Nov. 10, 2017, 3 Pages.

"International Search Report & Written Opinion Issued in PCT Application No. PCT/US2018/038386", dated Sep. 5, 2018, 13 Pages.

"International Search Report & Written Opinion Issued in PCT Application No. PCT/US2018/038389", dated Sep. 5, 2018, 12 Pages.

"International Search Report and Written Opinion Issued in PCT Application No. PCT/US2018/023672", dated Jun. 6, 2018, 13 Pages.

"International Search Report and Written Opinion Issued in PCT Application No. PCT/US18/025775", dated Jul. 9, 2018, 12 Pages.

"International Search Report and Written Opinion Issued in PCT Application No. PCT/US18/025776", dated Jul. 3, 2018, 10 Pages.

"JavaScript Tutorial—Adding JavaScript to a page", Retrieved from http://www.howtocreate.co.uk/tutorials/javascript/incorporate, Retrieved on Nov. 15, 2017, 5 Pages.

"JSON", Retrieved from https://en.wikipedia.org/wiki/JSON, Retrieved on Nov. 15, 2017, 13 Pages.

"Learn How People Use Your App—An App Analytics Tools Round-Up", Retrieved from http://web.archive.org/web/20170427042015/https://www.apptamin.com/blog/app-analytics-tools/, Retrieved on Apr. 27, 2017, 26 Pages.

"Metadata", Retrieved from https://en.wikipedia.org/wiki/Metadata, Retrieved on Jul. 31, 2018, 15 Pages.

"Movie", Retrieved from https://schema.org/Movie, Retrieved on Nov. 15, 2017, 10 Pages.

"Non-Final Office Action Issued in U.S. Appl. No. 15/825,904", dated Aug. 9, 2018, 42 Pages.

"OEmbed", Retrieved from https://oembed.com/, Retrieved on Nov. 15, 217, 22 Pages.

"Organization of Schemas", Retrieved from https://schema.org/docs/schemas.html, Retrieved on Nov. 10, 2017, 2 Pages.

"Out Attribute", Retrieved from https://docs.microsoft.com/en-us/windows/desktop/Midl/out-idl, Retrieved on Nov. 10, 2017, 3 Pages.

"Propget Attribute", Retrieved from https://docs.microsoft.com/en-us/windows/desktop/Midl/propget, Retrieved on Nov. 10, 2017, 2 Pages.

"Retval Attribute", Retrieved from https://msdn.microsoft.com/en-us/library/windows/desktop/aa367158(v=vs.85).aspx, Feb. 12, 2017, 2 Pages.

"Serialization", Retrieved from https://en.wikipedia.org/wiki/Serialization, Retrieved on Nov. 15, 2017, 9 Pages.

"Standard Clipboard Formats", Retrieved from https://docs.microsoft.com/en-us/windows/desktop/dataxchg/standard-clipboard-formats, Retrieved on Nov. 10, 2017, 5 Pages.

"StandardDataFormats Class", Retrieved from https://docs.microsoft.com/en-us/uwp/api/windows.applicationmodel.datatransfer.standarddataformats#Windows_ApplicationModel_DataTransfer_StandardDataFormats_Texthttps://csstricks.com/dom/, Retrieved on Nov. 15, 2017, 12 Pages.

"Tracking the Same Person across Different Devices with Google Analytic", Retrieved from http://www.seerinteractive.com/blog/real-cross-device-management/, May 8, 2014, 9 Pages.

"Uniform Resource Identifier", Retrieved from: https://en.wikipedia.org/wiki/Uniform_Resource_Identifier :, Retrieved From: Nov. 9, 2017, 9 Pages.

"XML", Retrieved from https://en.wikipedia.org/wiki/XML, Retrieved on Nov. 15, 2107, 15 Pages.

Chen, et al., "Inferring Human Activity in Mobile Devices by Computing Multiple Contexts.", In Journal of Sensors, vol. 15, Issue 9, Aug. 28, 2015, 20 Pages.

Finley, Kint, "Software Containers Are Bringing the Tech Giants Together", Retrieved From: https://www.wired.com/2015/06/software-containers-bringing-tech-giants-together/ :, Retrieved on: Nov. 1, 2017, 3 Pages.

Hogg, Scott, "Software Containers: Used More Frequently than Most Realize", Retrieved From: https://www.networkworld.com/article/2226996/cisco-subnet/software-containers--used-more-frequently-than-most-realize.html, Nay 26, 2014, 4 Pages.

Kapusta, Stephen, "Google AdWords Cross-Device Reporting & Attribution", Retrieved from https://www.lunametrics.com/blog/2016/11/08/google-adwords-cross-device-reporting-attribution/, Nov. 8, 2016, 7 Pages.

Lardinois, Frederic, "WTF is a container?", Retrieved from https://techcrunch.com/2016/10/16/wtf-is-a-container/, Oct. 17, 2016, 6 Pages.

Strassner, Tom, "XML vs JSON", Retrieved from https://www.cs.tufts.edu/comp/150IDS/final_papers/tstras01.1/FinalReport/FinalReport.html, Retrieved on Nov. 15, 2017, 6 Pages.

"International Search Report and Written Opinion Issued in PCT Application No. PCT/US2018/023673", dated May 18, 2018, 12 Pages.

"International Search Report and Written Opinion Issued in PCT Application No. PCT/US2018/018575", dated Apr. 17, 2018, 11 Pages.

"What is ActivTrak? : What Customers Say", Retrieved From: https://web.archive.org/web/20170324061743/https://activtrak.com/faq, Mar. 24, 2017, 10 Pages.

Frank, et al., "A Hybrid Preference Learning and Context Refinement Architecture", In Proceedings of Workshop on Intelligent Pervasive Environments, Apr. 9, 2009, 7 Pages.

"Class Object", Retrieved from <<https://docs.oracle.com/javase/7/docs/api/java/lang/Object.html>>, Published on: 1993, 9 Pages.

"In Java, are static class members shared among programs?", Retrieved from<<https://stackoverflow.com/questions/686079/in-java-are-static-class-members-shared-among-programs>>, Retrieved on: Jun. 28, 2017, 3 Pages.

"Observing the Activity of a Device", https://doc.nexthink.com/Documentation/Nexthink/V5.0/UserManual/Observingtheactivityofadevice, Retrieved on: Dec. 8, 2016, 5 pages.

Dalorzo, Edwin, "Java Optional Objects", Retrieved from <<https://dzone.com/articles/java-optional-objects>>, Published on: Apr. 17, 2013, 11 Pages.

(56) References Cited

OTHER PUBLICATIONS

Horvitz, et al., "Learning Predictive Models of Memory Landmarks," *Proceedings of the Annual Meeting of the Cognitive Science Society*, vol. 26, Jan. 2004, 7 pages.

Kapitza, et al., "Platform-Independent Object Migration in CORBA", In Proceedings of the Confederated International Conference on the Move to Meaningful Internet System, Oct. 31, 2005, pp. 900-917, 18 pages.

Paul, Ian, "Top 15 Cloud Storage Tips and Tasks," http://www.pcworld.com/article/255072/top_15_cloud_storage_tips_and_tasks.html, Published on: May 6, 2012, 4 pages.

Wolff, Franck, "JSON-R: A JSON Extension That Deals With Object References (Circular and Others)", Retrieved from <<https://dzone.com/articles/json-r-json-extension-deals>>, Jul. 26, 2013, 6 Pages.

"Final Office Action Issued in U.S. Appl. No. 15/590,895", dated May 13, 2019, 8 Pages.

"Final Office Action Issued in U.S. Appl. No. 15/590,858", dated Jun. 5, 2019, 18 pages.

Non-Final Office Action issued in U.S. Appl. No. 15/590,858, dated Dec. 31, 2018, 15 pages.

Non-Final Office Action issued in U.S. Appl. No. 15/590,895, dated Nov. 1, 2018, 9 pages.

Non Final Office Action Issued in U.S. Appl. No. 15/442,399, dated Mar. 8, 2019, 15 Pages.

Final Office Action Issued in U.S. Appl. No. 15/825,904, dated Feb. 21, 2019, 62 Pages.

"Notice of Allowance Issued in U.S. Appl. No. 15/442,399", dated Jun. 27, 2019, 11 Pages.

"Non Final Office Action Issued in U.S. Appl. No. 15/590,858", dated Sep. 24, 2019, 19 Pages.

"Non Final Office Action Issued in U.S. Appl. No. 15/661,981", dated Sep. 6, 2019, 21 Pages.

Cao, et al., "Image Annotation Within the Context of Personal Photo Collections Using Hierarchical Event and Scene Models", In Proceedings of the IEEE Transactions on Multimedia, vol. 11, No. 2, Feb. 2009, pp. 208-219.

Gemmell, et al., "MylifeBits: A Personal Database for Everything", Microsoft Bay Area Research Center, MSRR-TR 2006-23, Feb. 20, 2006, pp. 1-18.

Mills, et al., "Managing Photos with AT&T Shoebox", In Proceedings of the 23rd Annual International ACM SIGIR Conference on Research and Development in Information Retrieval, Jul. 24, 2000, p. 390.

Toyama, et al., "Geographic Location Tags on Digital Images", In Proceedings of the Eleventh ACM International Conference on Multimedia, Nov. 2, 2003, pp. 156-166.

"Non Final Office Action Issued in U.S. Appl. No. 15/825,904", dated Oct. 25, 2019, 32 Pages.

"Notice of Allowance Issued in U.S. Appl. No. 15/590,858", dated Feb. 13, 2020, 8 Pages.

* cited by examiner

| 248 | |
|---|---|
| Type | 250 |
| ActivityReferenced | 252 |
| EventPeriod | 254 |
| ActiveTime | 256 |
| ReportingSource | 258 |
| DeviceID | 260 |
| DisplayText | 262 |
| ReportTime | 264 |
| LocalRelevance | 266 |
| NavigationalMnemonicIDs | 268 |

| 272 | |
|---|---|
| NavigationalMnemonicIDs | 274 |
| ReportingSource | 276 |
| Time | 278 |
| NavigationalMnemonicType | 280 |
| AssociatedTasks | 282 |
| AssociatedActivities | 284 |
| AssociatedHistoryRecords | 286 |
| AscNavigationalMnemonics | 288 |
| ActivationTarget | 290 |
| Properties | 292 |
| DisplayText | 294 |
| Image | 296 |

| 200 | |
|---|---|
| TaskID | 202 |
| ActivityIDs | 204 |
| DisplayText | 206 |
| Image | 208 |
| GlobalRelevance | 210 |
| NavigationalMnemonicIDs | 212 |
| CollaboratorIDs | 214 |
| SchemaID | 216 |

| 218 | |
|---|---|
| ActivityID | 220 |
| AppActivityID | 222 |
| ActivationTarget | 224 |
| ContentTarget | 226 |
| DisplayText | 228 |
| Image | 230 |
| Properties | 232 |
| ContentType | 234 |
| ApplicationID | 236 |
| AppDisplayName | 238 |
| AppIcon | 240 |
| GlobalRelevance | 242 |
| NavigationalMnemonicIDs | 244 |
| CollaboratorIDs | 246 |

FIG. 2

COLLECTION AND CONTROL OF USER ACTIVITY SET DATA AND ACTIVITY SET USER INTERFACE

CROSS REFERENCE TO RELATED APPLICATION

This application claims the benefit of, and incorporates by reference, U.S. Provisional Patent Application No. 62/478,536, filed Mar. 29, 2017.

BACKGROUND

Computer devices are becoming ever more ubiquitous, and more and more of people's day-to-day activities involve computer devices. During the course of a day, a user may carry out many activities using one or more computer devices—such as watching videos, listening to music, browsing the web, using a chat or communication program, working on a document or presentation, or playing a game, among others.

In many cases, a user may be concurrently carrying out multiple activities using even a single computer device. Increasingly, people desire and need to carry out activities involving, and between, multiple computer devices. For example, a user may engage in a work-related activity using multiple different computer devices, such as a smartphone, work desktop computer, laptop computer, and home desktop computer. A user may start watching an entertainment program on their laptop computer, but may wish to continue watching on their smartphone or tablet computer at a later time. A user may start researching a topic on the web at work on their desktop computer, and continue their research on a smartphone or tablet computer during their commute home.

As computer devices are used for a larger number of activities, and become more integrated into people's lives, it can become challenging for a user to track their activities and associated content. For example, a user may wish to access a web page the user browsed two days earlier, but may not remember the address of the web page, or how they found it. A user may have been listening to a song on their computer device, or watching a video, but may no longer remember the title of the song or video.

In some cases, a computer device, such as an individual application running on the computer device or an operating system of the computer device, may provide some limited functionality for a user to try and trace their activity. For example, an operating system component may allow the user to view of a list of recently created or modified files. A web browser may allow a user to access a history of web pages visited by the user.

However, at least certain information regarding activities, such as files opened by a user, but not modified by the user, may not be available to the user. Even when information is available, the specific information in which the user is interested may be intermixed with voluminous amounts of other information. For instance, the address of a web page a user wants to find may be intermixed with information for scores of other web pages the user visited on a particular day. If the user cannot remember the particular day they visited the web page, the task becomes even more challenging and frustrating.

Commonly, users engage in multiple activities with one or more computer devices in order to accomplish a particular task. For a work project, a user may carry out activities using a web browser, a word processor, a spreadsheet program, and a presentation authoring program, among others. Many of these activities may be carried out concurrently. Thus, in order to resume work on a project, a user may need to resume a prior state of multiple different activities, compounding the problems noted above. In addition, the use of multiple applications to carry out tasks can complicate trying to engage in the task on different computer devices. For instance to continue work on a task that the user originally engaged in on a desktop computer on a laptop computer, a user may have to manually find the relevant files, transfer them from the desktop computer, open each application, and then return to the point where they left off working for each application—such as a particular slide of a presentation, or page of a document, the user was creating or editing. This scenario further assumes that the relevant applications are already installed on the laptop computer. Thus, room for improvement remains for tracking a user's tasks and activities on one or more computer devices, making the information easily and intelligently accessible to the user, and allowing a user to easily resume a task or activity.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are described for acquiring and controlling information regarding user activities and sets, or tasks, of one or more user activities. Tasks can include activities carried out on multiple computer devices, including multiple computer devices of a particular user. Activities associated with a task can include activation information, such that a user can resume all or a selected portion of activities associated with a task by interacting with a representation of the task. Users can create tasks to help organize their activities on their computer devices. Navigational mnemonics can be associated with tasks and activities, and can assist a user in locating tasks and activities that may be of interest to the user.

According to an embodiment, a computer device is provided that includes a processing unit and memory. The computer device is coded to perform operations for creating a task record for one or more user activities. Activity data is received for each of a plurality of user activities. The activity data for each user activity includes an identifier that identifies the particular activity, an application identifier, and a content identifier. The activity data is stored in a data structure. User input is received associating one or more of the plurality of user activities with a task record that includes an identifier that identifies the task record and the activity identifiers of the associated user activities. The one or more user activities are associated with the task record based on the user input. The task record is stored in a data structure, such as a queue, list, stack, heap, tree, or graph.

In another embodiment, a method is provided for rendering a display that includes a task representation. A request is received to generate a display of user tasks and activities associated with, respectively, task records and activity records. Selection criteria for the request is determined. The selection criteria can be, for example, a time, a navigational mnemonic, or a keyword or search query. One or more data structures are queried to determine task records and activity records responsive to the selection criteria. Information from the responsive task records and activity records is retrieved.

A display is rendered for output to a buffer. The display includes information associated with the responsive task records and activity records.

In a further embodiment, a method is provided for displaying a task representation for a task record and information for an activity record of an activity associated with the task record. A plurality of user activity records are received. Each activity record includes an identifier for the activity record, an application identifier, and a content identifier. At least one task record is received. The at least one task record includes at least one activity record identifier. The at least one task record is sent to another computer device.

The present disclosure also includes computing systems and computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 2 is a diagram illustrating data that can be included in task records, activity records, and history records, summarizing user actions on one or more computer devices, and in navigational mnemonic records.

DETAILED DESCRIPTION

Overview

Figure 1:
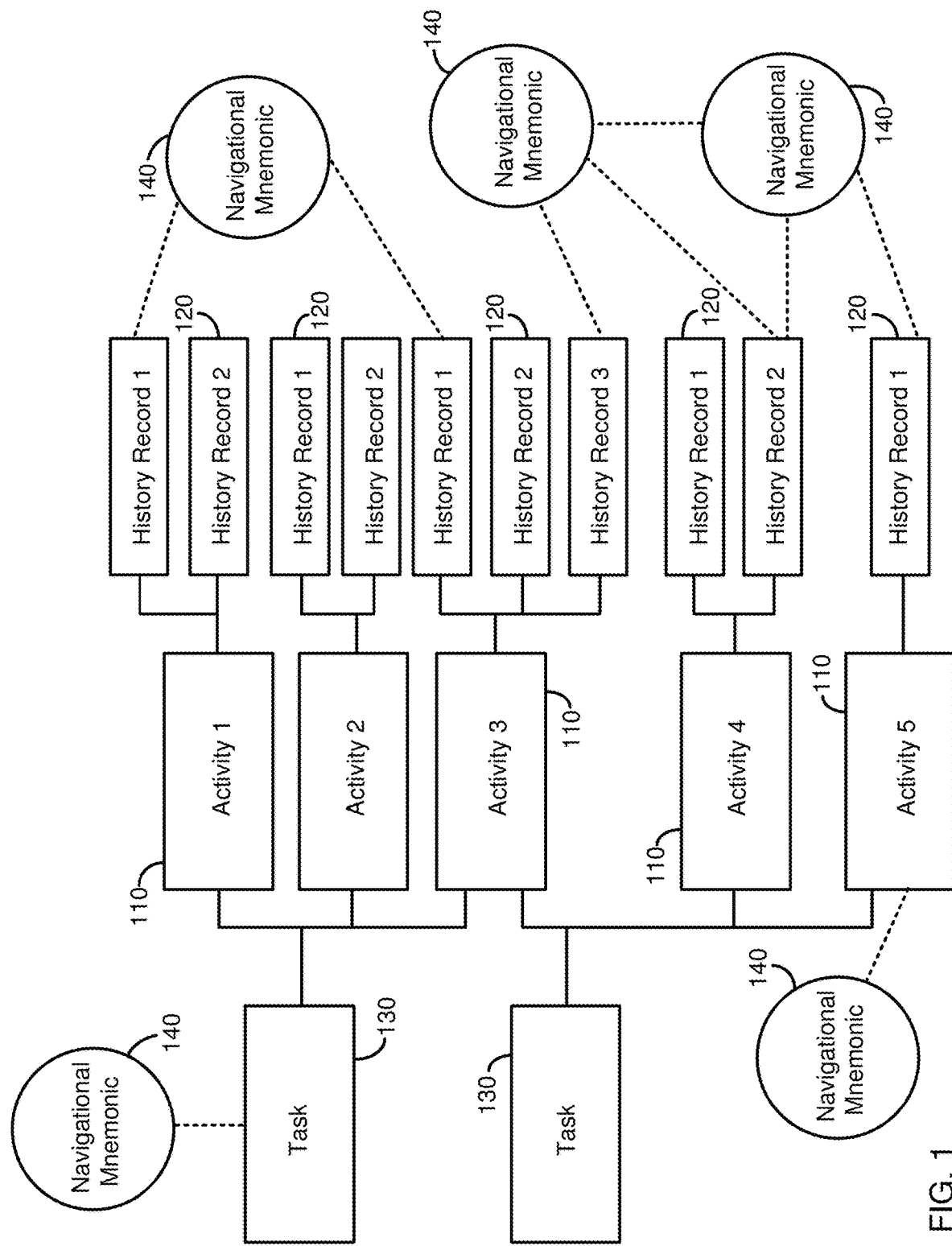
FIG. 1 is a diagram illustrating relationships between tasks, activities, and history records, corresponding to user actions on one or more computer devices, and navigational mnemonics.

Computer devices are becoming ever more ubiquitous, and more and more of people's day-to-day activities involve computer devices. During the course of a day, a user may carry out many activities using one or more computer devices—such as watching videos, listening to music, browsing the web, using a chat or communication program, working on a document or presentation, or playing a game, among others.

In many cases, a user may be concurrently carrying out multiple activities using even a single computer device. Increasingly, people desire and need to carry out activities involving, and between, multiple computer devices. For example, a user may engage in a work-related activity using multiple different computer devices, such as a smartphone, work desktop computer, laptop computer, and home desktop computer. A user may start watching an entertainment program on their laptop computer, but may wish to continue watching on their smartphone or tablet computer at a later time. A user may start researching a topic on the web at work on their desktop computer, and continue their research on a smartphone or tablet computer during their commute home.

As computer devices are used for a larger number of activities, and become more integrated into people's lives, it can become challenging for a user to track their activities and associated content. For example, a user may wish to access a web page the user browsed two days earlier, but may not remember the address of the web page, or how they found it. A user may have been listening to a song on their computer device, or watching a video, but may no longer remember the title of the song or video.

In some cases, a computer device, such as an individual application running on the computer device or an operating system of the computer device, may provide some limited functionality for a user to try and trace their activity. For example, an operating system component may allow the user to view of a list of recently created or modified files. A web browser may allow a user to access a history of web pages visited by the user.

However, at least certain information regarding activities, such as files opened by a user, but not modified by the user, may not be available to the user. Even when information is available, the specific information in which the user is interested may be intermixed with voluminous amounts of other information. For instance, the address of a web page a user wants to find may be intermixed with information for scores of other web pages the user visited on a particular day. If the user cannot remember the particular day they visited the web page, the task becomes even more challenging and frustrating.

Commonly, users engage in multiple activities with one or more computer devices in order to accomplish a particular task. For a work project, a user may carry out activities using a web browser, a word processor, a spreadsheet program, and a presentation authoring program, among others. Many of these activities may be carried out concurrently. Thus, in order to resume work on a project, a user may need to resume a prior state for multiple different activities, compounding the problems noted above. In addition, the use of multiple applications to carry out tasks can complicate trying to engage in the task on different computer devices.

For instance, to continue work on a task that the user originally engaged in on a desktop computer on a laptop computer, a user may have to manually find the relevant files, transfer them from the desktop computer, open each application, and then return to the point where they left off working on each application—such as a particular slide of a presentation, or page of a document, the user was creating or editing. This scenario further assumes that the relevant applications are already installed on the laptop computer. Thus, room for improvement remains for tracking a user's tasks and activities on one or more computer devices, making the information easily and intelligently accessible to the user, and allowing a user to easily resume a task or activity.

The present disclosure provides innovations that can allow a user to more easily track their tasks and activities on a computer device, and, in particular embodiments, across multiple computer devices. In part, the innovations can be facilitated by tracking the same, or related, user activities over time, including as tasks, or sets, of one or more activities. The number of times the user engaged in an activity, or the duration of time the user spent engaged in the activity, can be related to its importance to the user. For example, if a user spent twenty minutes on a particular web page, that might indicate that the web page was more important than another web page that the user landed on and then immediately navigated back to a prior page. However, a web page that the user visited for only a short time, but resulted in another, related, significant activity, such as sending an email or placing a phone call, may indicate that the web page has a high significance to the user.

Thus, as will be described in more detail, the disclosed innovations relate to collecting data regarding user activities, organizing the information, such as associating user actions with a single activity, rather than as a series of isolated actions and grouping one or more activities in a set (which can represent a task), and providing user interfaces that enable the user to review their tasks and activities to find information of interest, and to resume a particular activity of set of activities (e.g., the activities associated with a task). Additional details regarding user activity information and displays associated therewith are disclosed in copending application Ser. No. 15/442,399, filed Feb. 24, 2917, and copending application Ser. No. 15/661,981, filed Jul. 27, 2017, each of which is incorporated by reference herein in its entirety.

The disclosed innovations also relate to collections, or sets, of one or more activities. Such collections or sets can also be referred to as tasks. For convenience, the term "task" is generally used in the following discussion, where the term can refer to a collection or set of one or more activities. In particular implementations, a task includes (or is capable of including) multiple activities. Typically, the activities of the collection or set are related in some manner, such as to achieve a particular purpose (e.g. the "task"). However, no particular relationship between activities in the set or collection for the "task" is required. That is, for example, a user may arbitrarily select activities to be included in a set or collection and, as the term is used herein, may still be referred to as a "task."

Although a task typically includes a plurality of activities, a task can include as single activity. However, the task is a separate entity (e.g., a separate instance of an abstract or composite data type) from the activity. For instance, a user may start a task with a particular activity, but may add additional activities to the task as the user works on the task. In general, activities can be added or removed from a task over time. In some cases, the adding and removing can be automatic, while in other cases the adding and removing is manually carried out by a user (including in response to a suggestion by a computer device to add or remove an activity). Similarly, the creation of tasks can be automatic, or tasks can be instantiated by a user in particular ways. For instance, a software component can monitor user activities and suggest the creation of a task that includes activities the software component believes may be related to a common purpose. The software component can employ various rules, including heuristics, or machine learning in suggesting possible tasks to be created, or activities to be added to an existing task.

In some aspects, in addition to organizing component activities, tasks can have additional properties that can assist a user. For example, the task may be represented by a user interface element that can be "pinned" or associated with various aspects of a graphical user interface—such as being pinned to a start menu, an application dock or taskbar, or a desktop. A user may be able to customize a representation of a task, including its title, a representative image associated with the task, and a color scheme associated with the task, all of which can make the task easier for the user to identify. In addition, a user may choose to share tasks, or particular activities of a task, such as in order to collaborate with other users to accomplish the task.

In order to further assist an individual in locating a particular activity or task, or to otherwise provide context to an individual regarding user tasks and activities, the disclosed innovations include displaying task and activity information in association with navigational mnemonics. As used herein, a navigational mnemonic is information that is likely to be highly memorable to a user, and can aid a user in determining whether tasks and activities associated with the navigational mnemonic are, or are not, likely to be related to information they are seeking, or otherwise provide context to a display of task and activity information. For instance, a user may associate a navigational mnemonic with tasks and activities carried out by the user in temporal proximity to a time associated with a navigational mnemonic. The time may be a time the navigational mnemonic occurred, or a time that the user associates with the navigational mnemonic. The navigational mnemonic may be a significant news or entertainment event, such as the release date of a new blockbuster movie or the date of a presidential election.

Although the present disclosure generally describes navigational mnemonics used to locate past tasks and activities, navigational mnemonics can be provided regarding prospective tasks and activities. For instance, images of a person or a location can be provided as navigational mnemonics proximate upcoming calendar items for a task or activity.

As an example of a navigational mnemonic that is relevant to a particular user, a location, such as where the individual took a vacation, may be particularly memorable to the individual at various times, such as when they booked their vacation, or when they left for, or returned from, their vacation. Thus, some potential navigational mnemonics, such as news stories, may be relevant to a large number of individuals, while other navigational mnemonics may be relevant to a single individual, or may be relevant in different ways to different users.

Navigational mnemonics can be displayed proximate information regarding tasks and activities that a user is likely to associate with the navigational mnemonic. If the individual recalls the task or activity they are looking for as not associated with a displayed navigational mnemonic, the user can scroll more quickly through the displayed tasks and activities, including until the user recognizes a navigational mnemonic associated with the task or activity they are seeking. If the user associates a displayed navigational mnemonic with a task or activity of interest, the user can look more closely at associated tasks and activities, including selecting to display more detailed information for tasks or activities associated with the navigational mnemonic.

According to an aspect of the disclosed innovations, a user can select a navigational mnemonic to establish relevance criteria to determine tasks, activities, and other navigational mnemonics to be displayed. For example, a particular person might be used as a navigational mnemonic, perhaps because the user received a telephone call or email from the person. In a view that displays tasks and activities according to a chronological order, selecting the person may cause the displayed tasks and activities to instead use the person as the relevance criteria, and display a list of tasks and activities that are associated with the person, even if they are not the most recent tasks and activities. Or, selecting the person may cause a display of tasks and activities that use personal identifiers as the relevance or display criteria, rather than chronology.

The disclosed navigational mnemonics can be incorporated into a variety of graphical user interface displays, including those that present a summary or selection of user tasks and activities, such as tasks and activities meeting particular relevance criteria, displays of complete task and activity history, and displays of query results from searching for tasks and activities meeting particular criteria. In particular aspects, the displays can at least initially include a chronological or timeline display of tasks and activities. The displays can be incorporated into other applications, or provided with other functionality, such as displaying navigational mnemonics in calendaring or "to do" applications. In some cases, navigational mnemonics can be provided for both past and prospective activities, tasks, calendar items, reminders, etc.

In at least some cases, task and activity information displayed to a user can include features that enable the user to provide input to resume the task or activity. For example, if the activity was watching a movie, the user can be presented with information regarding that activity, and, if the user selects the activity, the user may be taken to an application capable of displaying the movie (such as the application on which the movie was originally viewed), the movie can be loaded into the application, can be forwarded to the position where the user left off watching the movie, and playback can be resumed. For tasks, one or more of the constituent activities of the set of activities associated with the task can be resumed. In the scenario of a user resuming a work related task, resuming the task might involve navigating to a particular web page using a web browser, loading a document in a word processing program, and loading a presentation in a presentation authoring program.

In some aspects, a task or activity (including one or more activities associated with a task) can be resumed at a device other than a device on which the task or activity was originally (or last) conducted, or the task or activity can be initiated at a device other than a device at which the task or activity will be resumed. Similarly, navigational mnemonics can be provided on one device that are associated with another device, including user tasks and activities on the other device.

In some cases, as described above, selecting a navigational mnemonic can cause a display (including reorganizing an existing display) based on relevance criteria or other parameters associated with the selected navigational mnemonic. In addition, or instead, selecting a navigational mnemonic can cause a display of information regarding, or relating to, a navigational mnemonic. For instance, selecting a navigational mnemonic that is associated with an individual or a place may cause a display of images of, or related to, the image or place. If the navigational mnemonic is an event, or entertainment content, selecting the navigational mnemonic may provide options for participating in the event or accessing the content.

Information regarding user tasks, activities, and navigational mnemonics can be collected across multiple devices and distributed to devices other than the device on which the task or activity was performed, including through an intermediate service or one of the computer devices that serves as a master repository for user data. In particular cases, an intermediate service, such as a cloud-based service, collects activity information from multiple computer devices of a user, and reconciles any differences between task and activity information, and navigational mnemonics, from the devices. The intermediate service (or master device) can thus serve as an arbiter of "truth," and can distribute task and activity information, and navigational mnemonics, to the user's devices, including such that a particular device may be provided with activity information and navigational mnemonics for other user devices, or updated information can be provided for the particular devices. In this way, displays can be provided that allow a user to view their activity, in association with one or more navigational mnemonics, across multiple computer devices. In a similar manner, the intermediate service can allow information to be shared between multiple users (each of which may be associated with multiple computer devices).

Thus, the disclosed innovations can provide a number of advantages, including:
- an interface for users to create and modify tasks, sets or collections of one or more activities;
- an interface that allows a user to resume a task, including one or more activities associated with a task;
- an interface that allows a user to switch between activities in a task within a window of the interface;
- a data model that stores information for a task, including for one or more activities associated with the task;
- a data model that stores information for a task that allows task activities to be automatically resumed;
- allowing tasks, or component activities, to be resumed at a different computer device than the device on which the user last engaged in the task;
- providing for tasks or activities to be sent between different computer devices of a user;
- providing for tasks, or component activities thereof, to be shared between users;
- displays that include user task information from multiple computer devices; and
- retrieving, organizing, and displaying tasks using relevance criteria.

These innovations relate to the technical field of computer science, as they collect, distribute, and arbitrate information relating to a user's tasks and activities on one or more computer devices and facilitate further user interaction. The innovations provide a new task data type that can be instantiated automatically, or by user interaction, to organize activities. By allowing a user to quickly locate and resume a prior task or activity, the innovations improve the operation of the computer device, as the prior task or activity can be resumed more quickly than if the user manually carried out every step required to resume a task or activity, such as at a point when they last engaged in the task or activity. The innovations also improve the functioning of computer devices through innovative user interfaces that allow the user to interact with the computer devices to quickly locate relevant information and resume a task or activity. The innovations also facilitate interactions and information sharing between computer devices, such as by allowing users to view task and activity information from one device on another device, resume a task or activity at a device that was originally carried out on another device, or resume a task or activity on a device by providing input on another device.

Relationship Between User History Records, Activities, Tasks, and Navigational Mnemonics In some aspects of the present disclosure, user activity associated with one or more computer devices is monitored, including activities associated with tasks. FIG. 1 illustrates how user activities 110 can have one or more history records 120 indicating a discrete instance of the activity, or an event associated with the activity, and how tasks 130 can be sets or collections of one or more activities. Activities 110 are typically associated with a software application and one or more particular content items (e.g., a document, a movie, a music file) that a user accesses or interacts with using the software application. Examples of software applications and associated content can be a word processing program and a particular file that was created, modified or accessed, a music program and a song or album the user listened to, a video playback program and a particular video the user watched, a social media application and particular individuals or entities the user viewed or contacted, and a web browser and particular web pages visited by the user.

In some cases, a user may engage in an activity 110 on a single occasion. In other cases, a user may engage in the same activity 110 on multiple occasions. For instance, in writing a document, a user may create the document and then edit it on multiple different occasions. At some point, the user may be finished with the document, and may not access it again, or may not access it again for a long period of time.

Each discrete occasion during which a user engages in an activity 110, or particular events associated with an activity (e.g., printing a document, forwarding an email, bookmarking a web page) can be represented, and summarized, by a history record 120. A history record 120 can be associated with a time the user began a particular instance of the activity 110 (or a time an event occurred), a time the instance ended, a duration the user was actively engaged in the activity, and other information.

History records 120 can include information that can be used to provide an indication of the importance of an activity (or instance or event thereof) relative to other activities (or instances or events thereof) a user may have engaged in over a time period. Relevance information can be a measure of how important the activity is likely to be to the user compared with other contemporaneous activities in which the user engaged using the same computer device, or among activities carried out by the user using multiple computer devices. For example, a user may listen to music using their smartphone at the same time they are editing a document on their laptop computer. Over the same time period, the user may send text messages using their smartphone, and have a web browser open on their laptop.

Activities 110 carried out using a single computer device may have differing relevance, or importance to the user. For instance, in the example above, although the user had a web browser open on their laptop, the most important activity to them may have been the document they were editing. On the smartphone, the text messages sent by the user may have a greater relevance to the user than the music they were listening to. Among all the activities being carried out by the user over a time period, editing the document may have been the most relevant activity. As will be further described, relevance can be determined in a number of ways based on various parameters. In addition, relevance can be calculated or measured using different schemas. For instance, a user may indicate that they want to view the most relevant work activities or the most relevant non-work activities.

Relevance can be determined by a single factor or a combination of multiple factors. One factor can include the amount of time a user was actively engaged in an activity 110. Another factor can relate to significant actions a user performed while engaging in the activity 110. In some cases, significant actions can be defined and reported by a particular application—for example, an application may report forwarding an email or "liking" a social media post as a significant action. In other cases, significant actions can be determined in other manners, such as by user actions tracked by an operating system. For instance, the act of printing an object, such as a file or web page, can be designated as a significant action and used to help determine a relevance value for the activity 110 (or a particular history record 120 or instance of the activity), or otherwise associated with the activity (such as being noted in an appropriate history record for the activity).

Different applications, and their corresponding activities 110, can be associated with higher or lower relevance factors, including depending on a type of application (e.g., a word processor may be assigned a higher relevance than a music playback application, web browser "A" may be assigned higher relevance than web browser "B", an "entertainment" application may be assigned a lower relevance than a "productivity" application). The relevance of an activity associated with an application may also depend on what other activities a user was simultaneously performing. For instance, word processing might be ranked as more relevant than web browsing, when performed concurrently, but web browsing might be ranked as more relevant than concurrent music playback.

Relevance can be determined, or refined, using machine learning techniques. For instance, if activities 110 are marked as relevant, but a user instead views information regarding other activities, the definition of relevance, or assigned relevance values, can be modified. Similarly, heuristics can be used to create or adjust relevance values. For example, patterns of user activities (e.g., a user likes to listen to music while reading the news on a website) or context (e.g., time of day, day of the week) can be recognized, and relevance indicators created or adjusted. When multiple factors are used to determine relevance values, or assign an overall relevance score to an activity 110 (or history record 120 or task 130), the factors can be weighted, or assigned confidence values, and the weightings or confidence values periodically adjusted, such as using machine learning, heuristics, or other techniques.

History records 120 can be generated by software applications with which the user interacts. In some cases, a software application, such as through an interface (e.g. calling a method of an API to create or modify a history record 120), can provide information for a history record. History records 120 can be created or modified, for example, when a user starts an application, when the user creates, modifies, or accesses new content using the application, when the user closes the application or particular content, or upon the occurrence of particular events in the application (e.g., saving a file, sending an email, printing a document).

In an example scenario, when a user watches a video, such as with a streaming video application or a website that provides streaming video, the application, or website, can call a method (e.g., of an API) to create or modify a history record 120. The call can include as arguments information such as an identifier of the application or website (or application and website), an identifier associated with the user, an identifier associated with the video being watched by the user, a time the user accessed the video (or started the application), a duration the user watched the video, and the playback position when the user stopped watching the video (or when the call was made).

In other cases, history records 120 can be generated by another application, or an operating system component, that monitors a user's activities. For instance, a monitoring component may track what applications a user opens, the duration the application was open, the duration the user was actively using the application (e.g., using measures such as the duration the application was in focus in a user interface, or the primarily active application, or other measures of user activity, such as input provided to the application through a keyboard or pointing device), files opened, modified, or created by the user, and significant actions taken by the user in association with the application (e.g., printing a document or downloading a file).

Typically, a filtering mechanism is applied to user activity, or at least user activity reporting by a monitoring component, such that not all user activity results in a history record 120. That is, some user actions may not be significant, in the sense that they are not likely to be related to activities that a user would later like to review or resume. As an example, if a user opens, and then quickly closes, a series of files, it may indicate that the user is looking for a file having particular contents, and the opened and closed files are files that the user determined not to be the correct file. Thus, it may not be likely that the user would later want to review those activities (and, in fact, showing those activities may hinder the user in finding information they seek), and so they may not result in the generation of history records 120. However, if after opening and closing a series of file, the user opened a file, printed the contents, and then quickly closed it again, that could indicate that the printed file was significant, and may be something the user would be interested in reviewing or resuming at a later date, and thus could be associated with a history record 120.

In some aspects, whether a history record 120 is created can depend, at least in part, on whether user actions can be associated with an existing activity 110. Typically, user actions are more likely to be relevant if they can be associated with a discrete activity 110 that the user has already carried out one or more times. For example, opening and closing a file may be more significant if the user has recently accessed the file on other occasions.

As will be further described, the present disclosure provides innovations for displaying information regarding a user's activities to the user, including individual instances (e.g., particular history records 120) when the user engaged in an activity 110. In some cases, more history records 120 can be created than are shown to the user. For example, a history record 120 may be generated and used to help determine the relevance of the activity 110 associated with the history record 120, or other history records. If a user accesses a document, even for a brief time, for instance, that may indicate that the activity 110 was somewhat more relevant to the user than other activities in which the user engaged during a relevant time period.

Activities 110 may be analyzed to determine which history records 120 to display to the user. For example, a user may only want to look at the most recent history record 120 for the top five most relevant activities 110 the user engaged in during a particular time period. Activity relevance can be determined, for example, using multiple history records 120 associated with the activity 110, even though the information eventually displayed to the user may be from only the most recent history record.

Each activity 110 can, but need not, be associated with one, or in some cases, multiple, tasks 130. A task 130 can represent a higher-level endeavor of the user that involves multiple activities 110. As an example, a task 130 may be a user preparing for an annual departmental review. As part of the annual review, the user may undertake activities 110 such as preparing a report, preparing a presentation, creating graphs and figures, and emailing colleagues. If desired, tasks 130 and activities 110 can have additional levels of organization. For example, preparing a report can also be a task 130, with preparing the report document and preparing graphics, figures, and images for the report all being underlying activities 110.

In some cases, tasks 130 can be created based on user input. For instance, a user may select one or more activities 110 and request that the activities be grouped together, or associated, as a task. In other cases, tasks 130 can be created automatically, such as by monitoring user activities to determine whether multiple activities may be related to a common purpose. As tasks 130 are associated with activities 110 (and in turn, history records 120 for the activities), tasks can access information associated with activities. Information associated with activities 110 for a task 130 can be displayed to the user in conjunction with the task, and can be used to allow a user to resume all or a portion of the activities for the task.

Tasks 130 can be dynamic, in that they can be created, modified by adding or removing activities 110 from the task, and deleted. In at least some cases, when a task 130 is deleted, or an activity 110 is removed from the task, the activities associated with the task, or removed from the task, are not deleted—the association between the task and the activity is simply removed.

One or more of activities 110, history records 120, and tasks 130 can be associated with one or more navigational mnemonics 140. Although activities 110, history records 120, and tasks 130 are shown as associated with different navigational mnemonics 140, in at least some aspects, a particular navigational mnemonic can be associated with a combination of these elements. For instance, a news story acting as a navigational mnemonic 140 may be particularly relevant to particular history records 120 associated with a particular instance of an activity 110 carried out on the date the news story appeared. A person can be a navigational mnemonic 140, and associated with an activity 110, including any history records 120 associated with the activity. The same navigational mnemonic 140 may also be associated with a task 130 that includes the activity 110.

FIG. 1 illustrates how navigational mnemonics 140 can aid a user in locating particular activities 110, history records 120, and tasks 130. For instance, a user may not remember a particular time they engaged in an activity 110 (associated with a particular history record 120), however, the navigational mnemonic 140 may be more memorable to the user. The user may remember that the navigational mnemonic 140 is associated with the history record 120 they are looking for (e.g. "I know I worked on the document after I spoke with Tom" or "I watched the movie on the day this event happened"). Thus, when looking for a history record 120, instead of reviewing each history record in detail, the user can scroll through history records until they see a navigational mnemonic 140 they associate with the history record, and then look at the history records associated with the navigational mnemonic in more detail (e.g., following the dashed lines shown in FIG. 1) to locate the activity they are looking for.

FIG. 1 also illustrates how navigational mnemonics 140 can provide relevance criteria that can be used to organize information regarding activities 110, history records 120, and tasks 130. For example, a display may initially present a chronological listing of history records 120, with interspersed depictions of navigational mnemonics 140. If a user selects a navigational mnemonic 140, the display can present activities 110, history records 120, tasks 130, or combinations thereof, that are associated with the selected navigational mnemonic (e.g. those to which the navigational mnemonic is connected by a dashed line).

In particular aspects, a navigational mnemonic 140 can be associated with one or more other navigational mnemonics. These associations can facilitate cascaded retrieval of information, or search, by a user, where a user can explore associations between navigational mnemonics in order to find information they are seeking. For instance, a navigational mnemonic 140 of a location may associated with a navigational mnemonic of a person, such as a person with whom the user interacted at the location. An activity record 120 of interest to the user may be associated with the person, but the user may not have initially remembered the person, or that particular navigational mnemonic 140 may not have been originally displayed to the user.

Data Model for Task Records, Activity Records, History Records, and Navigational Mnemonic Records FIG. 2 illustrates various properties that may be included in a task record 200, such as a record for the task 130 of FIG. 1. In particular examples, a task record 200 can be implemented as an abstract or composite data type, such as a class or a struct.

Each task record 200 is typically associated with a unique task identifier 202 ("TaskID"), such as an integer value. The task identifier 202 can be used by programs, or a computer device running a program, to uniquely name and identify a particular task. Each task record 200 can include one or more activity identifiers 204 ("ActivityIDs") that identify unique activities that are associated with the task record. In a particular example, the activity identifiers 204 can be one or more integers (e.g., an integer identifier for each component activity of the task record 200). In some cases, the activity identifiers 204 can include task identifiers 202 for other tasks 200. In this way one task can be a parent task to one or more additional tasks (which are, in effect, subtasks of the main or parent task).

Each task record 200 can be associated with text 206 ("DisplayText") to be displayed to identify or describe the task. The text 206 can provide a human-readable description of the task. In some cases, the text 206 can supplied by a user, in other cases, default text can be supplied, such as based on the nature of one or more activities associated with the task record 200. In other cases, the title 206 can be automatically provided, such as by an application through an interface or by a software component that creates and edits task records 200. Any default or automatically assigned value for the title 206 can be changed by a user.

Similarly, each task record 200 can be associated with an image or an icon 208 ("Image," which can specify a file path for an image file), which can be assigned by a user or can be supplied automatically by a program (e.g., a program providing for creation and management of task records 200, or by a program that supplies information for a task record, an activity, or an individual history record of an activity, such as through an API). In a specific example, the image 208 can be an image of one or more content items associated with an activity of the task record 200.

Each task record 200 can also include a global relevance indicator 210 ("GlobalRelevance"). The global relevance indicator 210 can be a value representing the predicted or estimated relevance, or importance, of a task 200 to a user relative to other tasks the user may have contemporaneously engaged in (e.g., during a time within the period defined by the earliest and latest history records of an activity associated with the task, bound by the earliest and latest history records over a time period, or at another selected time period that embraces the task and one or more additional tasks). The global relevance indicator 210 can be used, for example, to rank task records 200 (or activity records 218) by relative importance. In at least some aspects, the global relevance identifier 210 can rank tasks 200 by relevance across multiple computer devices (e.g., an activity on a smartphone can be ranked relative to an activity on a desktop computer).

In some cases, a task record 200 can include one or more navigational mnemonic identifiers 212 ("NavigationalMnemonicIDs") for any navigational mnemonic identifiers that have been associated with the task. The navigational mnemonic identifiers 212 can be used to select navigational mnemonics to be displayed in conjunction with the task associated with the task record 200. The navigational mnemonic identifiers 212 can also be used to retrieve task records 200 that are associated with a navigational mnemonic.

In some aspects, tasks can be shared between users. Accordingly, a task record 200 can include identifiers 214 ("CollaboratorIDs") for any users with whom the task record 200 can be shared. For instance, the identifier 214 may be associated with an account at a remote service (e.g., a cloud based service) for the other user. In some cases, new task records 200, and changes to tasks records, can be automatically sent to the cloud service, and computer devices for the appropriate collaborators updated. The identifier 214 can be associated with permissions for any collaborators, including by including another field in the task record 200. The permissions can specify, for instance, whether a collaborator has read-only privileges for the task record 200, or may make changes to the task record, which can then be propagated back to the original task record.

A task record 200 can also be associated with a particular display schema 216 ("SchemaID"). The display schema 216 can include display layout or style information for the task record 200, including how associated activities (e.g., associated through the activity identifiers 216) are displayed. The display schema 216 can include, or can identify, a color that will be displayed in association with information of the task record 200.

The task record 200 can include more, less, or different information than shown in FIG. 2. For example, the task record 200 can include information that is extracted from information that is maintained for activities associated with the task record, or with their underlying history records. The information can include identifiers for applications or computer devices used to carry out the task associated with the task record 200. In some cases, instead of, or in addition to the global relevance identifier 210, a task record 200 can have a field having one or more values representing predicted or estimated relevance, or importance, of a task record 200 relative to other tasks carried out on particular computer device(s) (e.g., a local relevance identifier).

Tasks records 200 can also include additional information that can be used to associate task records with other tasks records, with activity records 218, with history records 248, or with navigation mnemonic records 272. Such information can include people associated with the task (e.g., contacts, collaborators), one or more locations associated with the task (such as determined using a hardware sensor of a computer device), times associated with the task, or content associated with the task.

FIG. 2 also illustrates various properties that may be included in an activity record 218, such as a record for an activity 110 of FIG. 1. In particular examples, activity records 218 can be implemented as an abstract or composite data type, such as a class or a struct.

Each activity record 218 is typically associated with a unique activity identifier 220 ("ActivityID"), such as an integer value. The activity identifier 220 can be used by programs, or a computer device running a program, to uniquely name and identify a particular activity. The activity identifier 220 can be used to as the source of the activity identifiers 204 of a task record 200.

Each activity record 218 can include an application activity identifier 222 ("AppActivityID"). The application activity identifier 222 can be supplied to an application associated with the activity record 218 and can allow the application to identify the indicated activity, such as to resume the activity. Thus, the application activity identifier 222 can represent state or context information of the application, and can be referred to as activation information.

In at least some cases, the application activity identifier 222 can be supplied by an application that was used to carry out the activity associated with the activity record 218. For instance, for a video application, the video application may create an identifier than indicates a particular video a user was watching, and the playback position within the video. If the activity associated with the corresponding activity record 218 is selected to be resumed, the application can be provided with the application activity identifier 222, which the application can use to locate and resume the user's prior session.

Each activity record 218 can also include an activation target identifier 224 ("ActivationTarget"). The activation target identifier 224 can be used to locate, such as to execute, a particular application associated with the activity record 218. In some cases, the value of the activation target identifier 224 can identify a specific application, such as a specific application on a particular computer device (e.g., a file path for an executable file associated with the application).

In other cases, the value of the activation target identifier 224 can be used to identify a particular application, but not a specific application on a specific computer device. For instance, if a user has a desktop computer, a laptop computer, a tablet computer, and a smartphone, in some cases, the value of the activation target identifier 224 can identify a specific application of a specific computer device, such as the laptop computer. In other cases, the value of the activation target identifier 224 can identify a particular application, such as a particular media player, and the activated application can depend on the identity of the device on which the activity record 218 is located, or the device on which the activity of the activity record is to be resumed. That is, if the activity for the activity record 218 is selected from the tablet computer device to be resumed, the application for the tablet computer device can be executed, while the application for the desktop computer is executed if it is used to resume the activity. In some cases, a disambiguation service can translate the activation target identifier 224 to indicate a particular application (e.g., the location of an executable file) based on the identity of the device from which the activity is to be resumed. In particular aspects, if an activity for an activity record 218 is to be resumed at a device, and the necessary application is not installed on the device, the appropriate application can be determined and installed, or the user can be prompted to install the application.

The activity record 218 can include a content identifier 226 ("ContentTarget") that can be used to identify a particular content item (e.g., document file, video file, music file, image file, web page, etc.). In some cases, this information can be independently maintained by the associated application, such as in association with a session or context information indicated by the application activity identifier 222.

In some implementations or record instances, an activity record 218 may not have a value for the application activity identifier 222, or the value may not be sufficient to resume the context using the appropriate application. As an example, for activities created through monitoring of user actions, rather than activities directly created by an application (e.g., through an API), the associated application may not have state information that can be accessed by a value of the application activity identifier 222. If the monitoring that created the activity record 218 is able to determine the content used by the application as part of the activity, an identifier of the content (e.g., a file location or web address) can be stored as a value of the content identifier 226.

Even if an application includes state information that can be accessed by a value of the application activity identifier 222, the activity record 218 can still include the content target identifier 226. For instance, before an activity is resumed after being selected by a user, it can be determined whether the content associated with the content target identifier 226 is available. If the content is not available, the user can be presented with an error message, presented with an option to manually locate the content, or the content can be automatically located and downloaded to the computer device (including automatically when a device receives an activity record 218 referencing content not present on the device). Or, the value of the content target identifier 226 can be used to access the content to provide an image or preview of the content.

A human-readable title 228 ("DisplayText") can be included in the activity record 218. In some cases, the title 228 can be selected by a user. In other cases, the title 228 can be automatically provided, such as by an application through an interface or by a software component that creates and edits activity records 218. Any default or automatically assigned value for the title 228 can be changed by a user.

An image identifier 230 ("Image") can be used to identify an image (e.g., by a file path) that is associated with the activity record 218. In some cases, the image identifier 230 does not include a value. If the image identifier 230 is empty, no image is associated with the activity, in some aspects. In other aspects, if the image identifier 230 is empty, a default image, such as a content preview using the value of the content target identifier 226, or an image or icon of the application associated with the activity record 218, can be used as an image to be displayed in conjunction with other information of a particular activity record.

Properties data 232 ("Properties") can be used to store additional information associated with an activity record 218. For instance, the properties data 232 can include additional information to be supplied to an application to resume a prior state of the application and the relevant context, such as settings for the application. In particular cases, the properties data 232 can be stored as key-value pairs, with the key indicating a particular property or variable and the value indicating the value that should be supplied for the property or variable.

An activity record 218 can be associated with a content type, such as a document, a web page, audio, video, photos, and the like. The content type can be indicated by a content type identifier 234 ("ContentType"). The value of the content type identifier 234 can be used, for example, to sort activity records, or to allow activity records 218 to be searched by content type. The content identifier 234 can also be used to select display parameters for the activity record 218, such as a particular layout or style information.

Each activity record 218 can be associated with a particular application, indicated using an application identifier 236 ("ApplicationID"). In some cases, the application identifier 236 can be used to indicate a specific application on a specific computer device, or an application on a specific type or class of computer device (e.g., pc, tablet, smartphone). In other cases, the application identifier 236 can be used to indicate a specific application (e.g., a specific music playback program), but is not specific to a particular computer device. Each activity record 218 can also include a human-readable name 238 ("AppDisplayName") for the application, and an icon 240 ("AppIcon") representing the application.

Each activity record 218 can include a global relevance identifier 242 ("GlobalRelevance"). The Global Relevance identifier 242 can be a value representing the predicted or estimated relevance, or importance, of an activity to a user relative to other activities (or task records 200) that a user may have contemporaneously engaged in over a time period. The global relevance identifier 242 can be used to rank activities carried out by a user on different computer devices. In some case, instead of, or in addition to, the global relevance identifier 242, an activity record can include a local relevance identifier, indicating the relevance of the activity at one or more specific computer devices (e.g., a value for instances of the activity carried out using a smartphone and a value for instances of the activity carried out at a desktop computer).

An activity record 218 can include one or more navigational mnemonic identifiers 244 ("NavigationalMnemonicIDs") for any mnemonic identifiers that have been associated with the corresponding activity. The navigational mnemonic identifiers 244 can be used to select navigational mnemonics to be displayed in conjunction with the activity associated with the activity record 218. The navigational mnemonic identifiers 244 can also be used to retrieve activity records 218 that are associated with a navigational mnemonic.

As discussed above, in some aspects, tasks can be shared between users. In some implementations, collaborators can be specified at the level of a task, which all activities for the task being shared or not shared. In other implementations, sharing, or access permissions, can be specified at granularity of activity records 218 using collaboration identifiers 246 ("CollaboratorIDs"). The collaboration identifiers 246 may be used as otherwise described for the collaboration identifiers 214 of the task records 200.

Activity records 218 can include more, less, or different information than shown in FIG. 2. An activity record 218 can include information that associates the underlying activity with more than one application. For instance, a user may carry out the activity using one program (e.g., a particular word processing program) on their laptop, but a different program (e.g., a different word processing program) on their tablet computer. The activity record 218 can store information sufficient for the activity to be resumed using the appropriate application for a particular computer device.

Activity records 218 can also include additional information that can be used to associate activity records with other activity records, with task records 200, with history records 248, or with navigation mnemonic records 272. Such information can include people associated with the activity of the activity record 218 (e.g., contacts, collaborators), one or more locations associated with the activity (such as determined using a hardware sensor of a computer device), times associated with the activity, or content associated with the activity.

As discussed above, an activity (and an activity record 218 therefor) can be associated with one or more history records, representing a distinct occasion or period where a user was engaged in the activity, or a significant action or event associated with the activity. FIG. 2 illustrates various properties that may be included in a history record 248. In particular examples, history records 248 can be implemented as an abstract or composite data type, such as a class or a struct.

History records 248 can be created by different entities (e.g., components of different devices, or different components for a single device) and for different reasons. Accordingly, each history record 248 can include a type identifier 250 ("Type"). Values of the type identifier 250 can signify or memorialize when a user starts a new activity, when a user finished an activity, periods during which the user actively engaged in an activity, significant user actions regarding the activity (e.g., sending a text or email, sharing a document, printing a document, downloading a file, maximizing a window) or events within the activity (for example, for a game, finishing particular quests or levels). As will be further described, some history records 248 can be generated by an application (e.g., by calling an API that allows the application to create, retrieve, or modify history records, which can be associated with state information maintained by the application regarding the history records), and thus applications can have at least some flexibility to define history records types that are relevant to the particular application. Other types of history records 248 can be generic, or default, and can include history records that can be generated by monitoring user activity, without requiring specific input from an application.

Each history record 248 is associated with a particular activity record 218 using an activity identifier 252 ("ActivityReferenced"), which can, for example, store the value of the activity identifier 220 of the appropriate activity record. For certain types of history records 248, such as those designated by an application, or a monitoring component, as being "new," the creation of the history record 248 can trigger the creation of a new activity record 218, with the value of the activity identifier 252 of the new activity record being stored as the activity identifier 220.

Each history record 248 can include a time period identifier 254 ("EventPeriod"). In some cases, the time period identifier 254 can include start and end times for the particular user action(s) associated with a particular history record 248. In other cases, the time period identifier 254 can be a duration, such as number of hours, minutes, and/or seconds for which the user engaged in the activity, at some level. If the time period identifier 254 measures a duration, the history record 248 can include another field that records the time the user began the activity reflected in the history record.

Each history record 248 can also include a measure of the time the user was actively engaged in an activity, as opposed to perhaps having an application running, but not actively engaging with the application. This value can be recorded in an active time identifier 256 ("ActiveTime"). The amount of time a user was actively engaged in an activity can be supplied by a reporting application, such as when a history record 248 is created or modified in response to a call by an application, such as to an interface. If the application does not provide a value for the active time identifier 256, or if the history record 248 is created by monitoring user activity, the active time can be determined, for example, by tracking how long the associated application is in focus in a user interface and monitoring user input to the application, such as using a keyboard or a pointing device.

As history records 248 can be created by difference sources, such as a monitoring component or an application, or can be received from another device or a central repository, history records can include a reporting source identifier 258 ("ReportingSource"), indicating what entity was responsible for creating the history record. Similarly, a device identifier 260 ("DeviceID") can be included to indicate on which device the activity associated with the history record 248 occurred.

In at least some cases, at least some individual history records 248, as opposed to summarized information in an activity record 218, can be displayed to a user. A title 262 ("DisplayText") can include text to be displayed to a user in association with the history record 248. The title 262 can be automatically assigned, user-assigned, or default, and can be changed by a user, at least in some cases, as described for the title 206 of the task record 200.

Each history record 248 can be associated with a time at which the history record was created, or, in some cases, updated, such using a report time identifier 264 ("ReportTime"). The value of the report time identifier 264 can be used, among other things, to determine how immediate or recent the history record 248 is. If the value of the report time identifier 264 is recent, it may be more likely that the history record 248 will be updated than if the value is further in the past.

As an example, an application may create a history record 248 indicating that the user is engaging in an activity. The use may be ongoing, and so the duration initially in a history record 248 may be from a period from when the user initiated the activity to a time when the history record was created. Later, the user may stop using the application, and the application may update the history record 248 to reflect the actual time the user spent engaging in the activity. Thus, history records 248 created on a previous day, for example, may be much less likely to be updated than history records created with the past few minutes or hours.

As with task records 200 and activity records 218, history records 248 can have a relevance value that can be used to compare a history record with other activities (or particular history records thereof) a user was contemporaneously engaged in. In at least some cases, as individual instances of an activity are carried out on a single computer device, a history record 248 can include a value of a local relevance identifier 266 ("LocalRelevance") indicating the comparative relevance of the activity instance to other activity instances on the same computer device. By comparing history records 248 for multiple devices, a global relevance value, across multiple computer devices, can be determined and associated with a task record 200 or an activity record 218. However, in other implementations, a global relevance value can be determined for individual history records 248.

A history record 248 can include one or more navigational mnemonic identifiers 268 ("NavigationalMnemonicIDs") for any navigational mnemonic identifiers that have been associated with the corresponding activity instance. The navigational mnemonic identifiers 268 can be used to select navigational mnemonics to be displayed in conjunction with the activity instance associated with the history record 248. The navigational mnemonic identifiers 268 can also be used to retrieve history records 248 that are associated with a navigational mnemonic.

History records 248 can include more, less, or different information than shown in FIG. 2. History records 248 can include additional information that can be used to associate history records with other history records, with activity records 218, with task records 200, or with navigation mnemonic records 272. Such information can include people associated with the activity instance (e.g., contacts, collaborators), one or more locations associated with the activity instance (such as determined using a hardware sensor of a computer device), times associated with the activity instance, or content associated with the activity instance. History records 248 can also include sharing and permissions information, as described for task records 200.

Navigational mnemonics can be described using navigational mnemonic records 272. In particular examples, navigational mnemonic records 272 can be implemented as an abstract or composite data type, such as a class or a struct.

Each navigational mnemonic record 272 can include a navigational mnemonic identifier 274 ("NavigationalMnemonicID") that uniquely identifies the navigational mnemonic record, such as an integer value. Like history records 248, navigational mnemonic records 272 can be created by various sources, including by an application (e.g., by calling a method of an application program interface), a user activity monitoring service, or a navigational mnemonic feed service, which can be indicated in a report source field 276 ("ReportingSource"). Reporting sources can be used, for example, in selecting or prioritizing navigational mnemonics for use in a display.

A time 278 ("Time") can be included in the navigational mnemonic record 272. The time 278 can be a time the navigational mnemonic record 272 was created or another time that can be used to determine the relevance of tasks, activities, history records, and other navigational mnemonics to a particular navigational mnemonic represented by the navigation mnemonic record. For instance, an application may create a navigational mnemonic record 272 for a significant event (such as news story or well-known event) at a time after the event occurred. Rather than using the creation time of the navigational mnemonic record 272 for the time 278, it may be more appropriate to use the time the significant event occurred. In further aspects, navigational mnemonic records 272 can include fields that allow for both a creation time and one or more other significant times to be recorded.

A particular navigational mnemonic can be associated with a type, which can be included in the navigational mnemonic type field 280 ("NavigationalMnemonicType") of a navigational mnemonic record 272. A type 280 of a navigational mnemonic can be, for example, an event, a media item, a person (or other entity), a location, or an object. However, any suitable and desired classification can be used as a type 280, which can be specified at various degrees of granularity. For instance, for some uses, it may be useful to have a type 280 of "person," while in other cases a more suitable type may be "coworkers." Rules can also be defined that retrieve navigational mnemonic records 272 based on types 280 specified at different granularities. For instance, if a type 280 of a navigational mnemonic record 272 is specified as "movie," a search could be specified to obtain navigational mnemonic records of only the type "movie," while another search could be specified to obtain navigational mnemonic records associated with "entertainment content," which could be programmed to retrieve navigational mnemonic records having types of movies, music, books, television programs, etc.

In some cases, a navigational mnemonic record 272 can be associated with one or more specific tasks 282 ("AssociatedTasks"), activities 284 ("AssociatedActivities"), history records 286 ("AssociatedHistoryRecords"), and other navigational mnemonics records ("AscNavigationalMnemonics"), which can be specified using appropriate identifiers. For instance, if a navigational mnemonic record 272 is created by an application, the application may wish to associate the navigational mnemonic record with a specific instance of an activity, represented by a history record, 248, and so a value for the history record identifier 286 can be assigned when the navigational mnemonic record is created.

Navigational mnemonic records 272 can, in at least some cases, include an activation target 290 ("ActivationTarget"), which can be analogous to the activation target 224 of the activity record 218. For instance, if an application creates a navigational mnemonic record 272, it can provide a value for the activation target 290 that launches the application, such as to a particular state, upon detection of appropriate user input, or otherwise displays specified content. In other cases, the activation target 290 can be a command to generate a particular type of display associated with the navigational mnemonic record 272. The navigational mnemonic record 272 can include property information 292 ("Properties"), such as information that allows an application to achieve a particular state after being launched (such as content information).

Title 294 ("DisplayText") and image 296 ("Image") identifiers can provide a human-readable title for the navigational mnemonic of the navigational mnemonic record 272, as well as providing a visual cue for the user to associate with the navigational mnemonic. The value of the image 296 can specify a location or resource for an image, for example, an image of a person, a location, or an event memorialized by the navigational mnemonic record 272.

Navigational mnemonic records 272 can include more, less, or different information than shown in FIG. 2. Navigational mnemonic records 272 can include information that can be used to associate navigational mnemonic records with other navigational mnemonic records, with activity records 218, with history records 248, or with task records 200. Such information can include people associated with the navigational mnemonic (e.g., contacts, collaborators), one or more locations associated with the navigational mnemonic (such as determined using a hardware sensor of a computer device), times associated with the navigational mnemonic, or content associated with the navigational mnemonic. Navigational mnemonic records 272 can also include sharing and permissions information, as described for task records 200.

Collections of tasks records 200, activity records 218, history records 248, and navigational mnemonic records 272 can be maintained in one or more suitable data structures (e.g., queues, lists, heaps, stacks, binary search trees, graphs, and the like), including in a common data structure. As will be further described, such data structures can be searched for members meeting particular criteria (including having a particular relationship with another member), which can then be rendered for display. In addition, an application program interface can provide methods to set and get the various fields of the task records 200, activity records 218, history records 248, and navigational mnemonic records 272.

Figure 3:
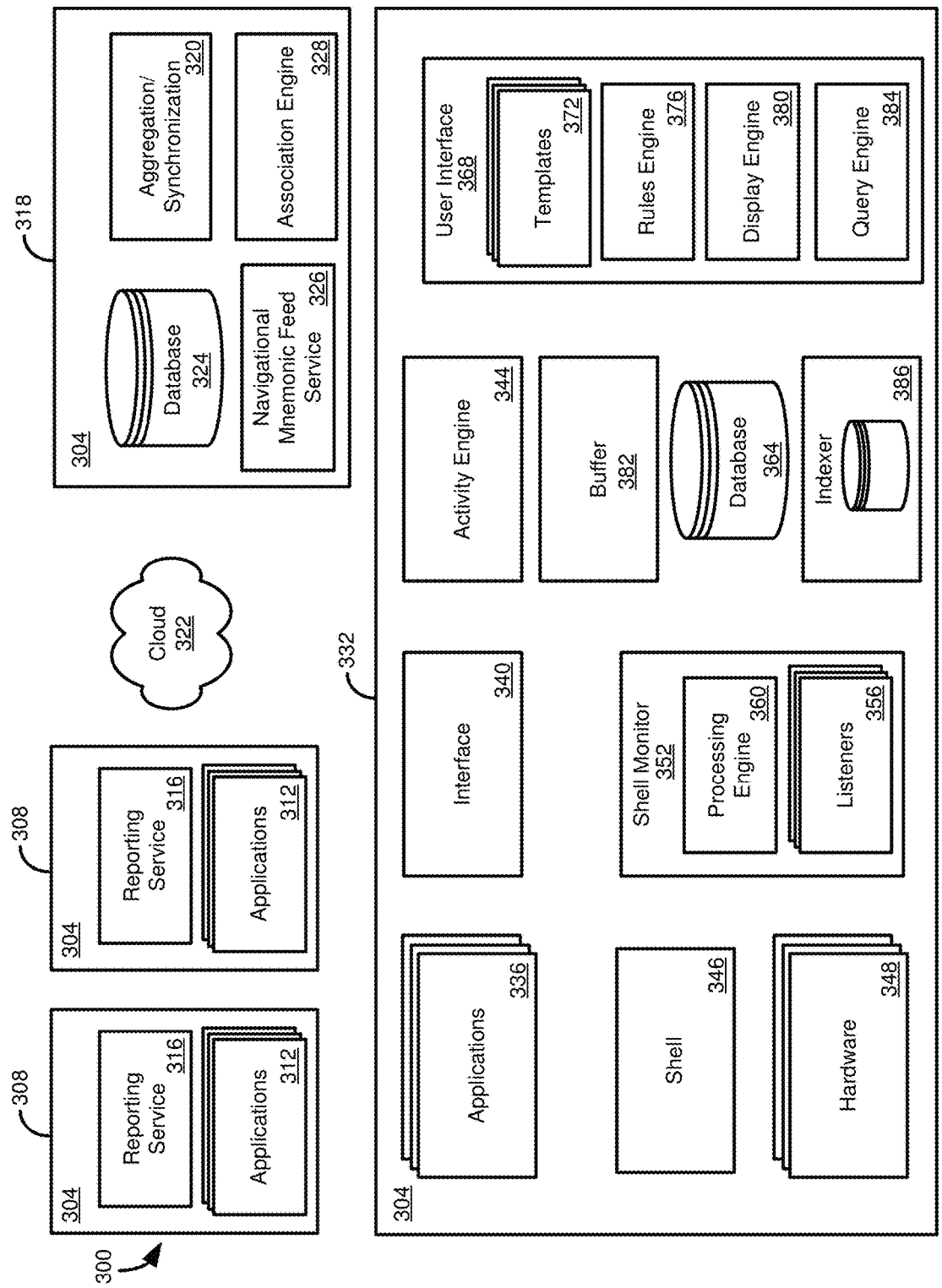
FIG. 3 is diagram of an example architecture in which the described innovations can be implemented.

Example Architecture for Capturing and Displaying User Task, Activity, and Navigational Mnemonic Information FIG. 3 illustrates an example architecture 300 that can be used to implement innovations of the present disclosure. The architecture 300 includes a plurality of computer devices 304. The computer devices 304 can include, for example desktop computers, laptop computers, tablet computers, smartphones, game consoles, smart televisions and appliances, and wearable technologies, such as smartwatches and smart glass. The computer devices 304 can include lightweight or heavyweight implementations of user task, activity, and navigational mnemonic monitoring or reporting, and user interfaces for accessing the results thereof.

For example, computer devices 308 include lightweight implementations of user task and activity monitoring or reporting, including reporting of navigational mnemonics. Each of the computer devices 308 can include a plurality of applications 312. A reporting service 316 can collect information reported by the applications 312, such as through an interface, and send it to a computer device 318 hosting an aggregation/synchronization component 320.

The computer devices 304 can be connected through a network or cloud 322. In some cases, the reporting service 316 can also send information to other computer devices 304, including those that include heavyweight implementations of user task, activity, and navigational mnemonic monitoring or reporting, such as computer device 332. The reporting service 316 can allow applications 312 to make various calls to an interface, such as an interface that provides for the creation or modification of information regarding user activity and/or navigational mnemonics, including information stored in one or more of task records, activity records, history records, and navigational mnemonic records (e.g., the task records 200, activity records 218, history records 248, and navigational mnemonic records 272 of FIG. 2).

The aggregation/synchronization component 320 can collect user task, activity, and navigational mnemonic information, or data, from one or more of the computer devices 304. The collected information may be used to update user task, activity, and navigational mnemonic information stored on one or more of the computer devices 304. For example, the computer devices 308 may represent mobile devices, such as smartphones or tablet computers. Computer device 332 may represent a desktop or laptop computer. In this scenario, the aggregation/synchronization component 320 can send information regarding the mobile devices 308 (e.g., task records, activity records, history records, or navigational mnemonic regards) to the desktop/laptop 332, so that a user of the desktop/laptop can be presented with a comprehensive view of their tasks and activities across all of the computer devices 304, including relative to navigational mnemonics that may be common to multiple computer devices or specific to a particular computer device. In other scenarios, the computer devices 308 may also be sent information regarding user tasks, activities, and navigational mnemonics on other computer devices 304, including the computer device 332.

The aggregation/synchronization component 320 can carry out other activities. For instance, the aggregation/synchronization component 320 can supplement or augment data sent by one computer device 304, including with information sent by another computer device. In some cases, the aggregation/synchronization component can associate history records for an activity carried out on one computer device 304 with a task having another activity carried out using another of the computer devices.

The aggregation/synchronization component 320 can also resolve conflicts between data received from different computer devices 304. For instance, conflicts can be resolved using a rule that prioritizes task, activity, or navigational mnemonic data from different devices, prioritizes task, activity, or navigational mnemonic data based on when the task or activity data was generated, prioritizes task, activity, or navigational mnemonic data based on a reporting source, such as a particular application or a shell monitor component, such as if two computer devices include history records or navigational mnemonics for the same activity at overlapping time periods.

For example, if a user was listening to music on two computer devices 304, the playback position in the same content may differ between the devices. The aggregation/synchronization component 320 can determine the appropriate playback position to associate with the activity. Thus, the aggregation/synchronization component 320 can determine "true" data for a task, activity, or navigational mnemonic, and can send this information to one or more of the computer devices 304, including a computer device on which the activity was not carried out, or updating data at a device where the activity was carried out with the "true" data.

In particular aspects, information from one or more of tasks, activities, and navigational mnemonics can be shared between different users. Each user can have an account in the computing device 318, such as stored in a database 324. Records for tasks, activities (including history records therefor), and navigational mnemonics can be stored in the database 324 in association with an account for each user. When information for a task, activity, or navigational mnemonic is received, and is to be shared with one or more other users, the shared information can be stored in the accounts for the other users, such as using the collaborator identifiers 214, 246 of FIG. 2.

The distribution of information between different user accounts can be mediated by the aggregation/synchronization component 320. In addition to distributing information to different accounts, the aggregation/synchronization component 320 can translate or format the information between different accounts. For instance, certain properties (e.g., applications used for various types of files, file paths, account information, etc.) of task records, activity records, history records, or navigational mnemonics records may be specific to a user or specific devices of the user. Fields of the various records can be replaced or updated with appropriate information for a different user. Accordingly, a user account can be associated with translation rules (or mappings) defining how various fields should be adapted for the user.

The aggregation/synchronization component 320 can also synchronize data needed to use any records received from another user, or from another device of the same user. For instance, records shared with a user may require an application or content not present on the user's device. The aggregation/synchronization component can determine, for example, whether a user's computer device has an appropriate application installed to open content associated with an activity. If the application is not present, the application can be downloaded and installed for the user, or the user can be prompted to download and install the application. If the content needed for a record is not present on the user's computer device, the content can be sent to the user's computer device along with the record, or the user can be prompted to download the content. In other examples, task records, activity records, history records, and navigational mnemonic records can be analyzed by a receiving computer device, and any missing content or software applications downloaded or installed (or other action taken, such as prompting a user to download content or install applications) by the receiving computer device.

In the case of navigational mnemonics for the same activity carried out at different computer devices, in particular aspects, the activity can be simply associated with all of the navigational mnemonics. In some cases, a record for a navigational mnemonic can include an identifier of a device on which the navigational mnemonic was generated, or with which the navigational mnemonic is associated (for instance, a location visited by the user as detected by a smartphone in the user's possession). Thus, this navigational mnemonic may be associated with both the determined location and the particular computer device.

The computer device 318 can also host a navigational mnemonic feed service 326. The navigational mnemonic feed service 326 can collect and/or store potential navigational mnemonics that may not be reported by a computer device 304 (although, in some cases, the navigational mnemonics of the navigational mnemonic feed service can overlap or duplicate one or more navigational mnemonics reported by a computer device), and may not be related to user activities carried out on the computer devices 308, 322.

The navigational mnemonic feed service 326 can be fully or partially curated. For instance, an administrator may determine navigational mnemonics to be added to the navigational mnemonic feed service 326. The navigational mnemonics added by the administrator can be, for example, events the administrator thinks are likely to be memorable to many users, a particular class of users, or even a particular user. Curation may include allowing particular sources (e.g. companies, applications, websites) to register navigational mnemonics for the navigational mnemonic feed service 326.

In other aspects, population of the navigational mnemonic feed service 326 can be fully or partially automated. Navigational mnemonics of the navigational mnemonic feed service 326 can include type or classification information that can be used to help match navigational mnemonics to particular users or classes of users, which may provide navigational mnemonics that are more likely to be useful to a particular user.

For example, the navigational mnemonic feed service 326 can include rules to determine navigational mnemonics to be added. A rule may state that the top five most viewed news stories for a day should be added as navigational mnemonics. Navigational mnemonics can also be added based on the analysis of navigational mnemonics reported by multiple users. A rule may state that the top five most popular navigational mnemonics are to be added to the navigational mnemonic feed service 326. Rules can be defined at a more granular level, such as stating the top five navigational mnemonics reported by users associated with a particular company will be added to the navigational mnemonic feed service 326 for other users associated with the company.

In some cases, navigational mnemonics can be provided to the user in order to provide the user with information that may be of interest to the user. Navigational mnemonics provided by the navigational mnemonic feed service 326 may represent news stories, media items (e.g. movies), or events (e.g., concerts, plays) that the user may wish to learn more about. The navigational mnemonic feed service 326 can store information with the navigational mnemonics to indicate whether a particular suggested navigational mnemonic should be used as a navigation aid, as an information suggestion, or both. In particular examples, a navigational mnemonic can be provided as a navigation aid, but can be associated with additional information regarding the navigational mnemonic in the event the user was not aware of the subject matter of the navigational mnemonic and wishes to obtain more information about it (e.g., to obtain a copy of the suggested media content or read a news story), or the navigational mnemonic itself is otherwise of specific interest to the user. In this way, a computing environment incorporating the disclosed innovations can provide more value to the user.

In order to help better associate navigational mnemonics, such as navigational mnemonics of the navigational mnemonic feed service 326, with a particular user, the computer device 318 can include an association engine 328. The association engine 328 can implement one or more techniques for associating particular navigational mnemonics of the navigational mnemonic feed service 326 with particular users. The techniques can include machine learning and rules, including heuristics. For instance, a rule can state that navigational mnemonics associated with a particular company will be displayed to users who are also associated with the company. A heuristic can be established that a user typically views a news website every day, and so navigational mnemonics associated with that website will be displayed to the user. Machine learning can be used to analyze what navigational mnemonics are most (or least) used by one or more users in order to develop rules that can be used to associate navigational mnemonics with particular users. Machine learning can also be used to determine what types of navigational mnemonics are most likely to be used by a user under particular circumstances (e.g., for a particular interface or search or browsing modality engaged in by a user).

Turning to the heavyweight implementation of the activity and navigational mnemonic monitoring and reporting service on the computer device 332, the computer device can include a plurality of applications 336. The applications 336 can directly create and modify tasks, activities, history records, and navigational mnemonics through an interface 340. The interface 340 can provide access to methods of an activity engine 344, which can create or modify task records, activity records, history records, and navigational mnemonic records.

In addition to user activity and navigational mnemonic information received directly from the applications 336 through the interface 340, the computer device 332 can receive user activity information by monitoring user activity, such as user activity associated with the shell 346 (e.g., an interface to services provided by an operating system of the computer device 332). Information associated with the shell 346 can include interactions with hardware devices 348, such as secondary storage devices, printers, pointing devices, keyboards, and other accessories. Interactions can include, for example, creating, opening, or closing a file, pointing activity (e.g., mouse clicks and cursor manipulation), keyboard input, and commands to print a document.

Shell activities can be monitored by a shell monitor component 352. The shell monitor component 352 can include listeners 356 for various user actions, such as listeners for hardware actions, listeners for keyboard or pointing device input, listeners for network activity, listeners for calls to the audio or video systems of an operating system, listeners for determining open and in-focus applications, and the like.

The shell monitor component 352 can further include a processing engine 360. The processing engine 360 can analyze the various user actions to associate the actions with particular applications 336 and to create history records or navigational mnemonic records that are provided to the activity engine 344. The activity engine 344 can associate the history records with appropriate activities or tasks, or create new activities or tasks as appropriate. The activity engine 344 can associate navigational mnemonic records with appropriate tasks, activities, or history records, or other navigational mnemonic records, or can store a navigational mnemonic record without immediately associating it with tasks, activities, history records, or other navigational mnemonics.

As an example of how the activity engine 344 can create navigational mnemonics based on user activity, a user may engage in audio or video communication with another person using the computer device 332, such as in a telephone call or using a voice over internet protocol client (e.g., the Skype service of Microsoft Corp. of Redmond, Wash.). This user activity can be associated with the particular person (or people) with whom the conversation was held. In addition, the conversation can be associated with the location of the user during the conversation, such as whether the user was at a coffee shop, their place of work, their home, in an airport, etc. The location can be determined, in some aspects, using a hardware device 348, such as a GNSS receiver, by analyzing a location associated with a Wi-Fi access point, or by determining a location associated with an internet protocol address associated with the computer device 332.

The identities of the person (or people) with whom the conversation was held, the location of the user during the conversation, or both, can be used as navigational mnemonics. For instance, if the user sees a name or an image of a person with whom they were speaking, and/or a location associated with the conversation, the user may associate that information with the subject matter of the conversation, including activities the user may associate with a conversation, such as a document they were editing or a website they browsed that was the subject matter of the conversation. Or perhaps the conversation was regarding a media item (such as a movie) that the user watched at a later time based on a recommendation the user received during the conversation.

While a navigational mnemonic is not an activity, it can have elements that are common to activities, including to activities that a user engaged in that occurred in temporal proximity to a navigational mnemonic, or which otherwise have a relationship to a navigational mnemonic. In the above example, the conversation can be an activity, which can be associated with an activity record, or a particular history record. The activity or history records can include the identities of the people involved in the conversation, and information regarding the location of the user during the conversion. However, the navigational mnemonic is not the conversation, but a person with whom the conversation was held or a location of the user during the conversation.

While the navigational mnemonic may be associated with the conversation (the activity), in the mind of the user, in the records for the navigational mnemonic or activity, or both, the navigational mnemonic may be used to locate other activities or navigational mnemonics, including activities or navigational mnemonics that are not directly related to the navigational mnemonic associated with the conversation. For instance, the user may be looking for an activity that they recall engaging in before or after the conversation or that is otherwise unrelated to the conversation. Thus, using navigational mnemonics, the disclosed innovations can facilitate information retrieval by the user even for information that is not directly associated with a navigational mnemonic.

The activity engine 344 can also create, or suggest for creation, records for tasks, or add or suggest for adding tasks to an existing task record. As an example, if a user is engaged with multiple applications over a period of the time, the activity engine 344 may determine that the user is likely carrying out a common purpose using the applications. Similarly, if the user routinely uses several applications in combination, the activity engine 344 may determine that when the combination of applications is in use that the use likely relates to a common purpose, and so may create, or suggest for creation, a task record. If the user creates a task using less than all of these typically associated applications, and then later opens another application that is typically associated with the combination, the activity engine 344 can suggest that the newly opened application be added to the task.

The activity engine 344, another component of the computer device 332, or the computer device in communication with the association engine 328, can employ rules, including heuristics, machine learning, other techniques, or combinations thereof in order to evaluate whether activities in which a user is engaged are likely to be part of a common activity. In particular, the association engine 328 can be used to determine whether activities in which a user is engaged at multiple computer devices (e.g., the devices 308 and the device 332) are likely to be part of a common task. In addition to data associated with a particular user, in some aspects, the association engine 328 can access data of the database 324 to use data from other users to help more accurately associate activities with a common task.

In some cases, the activity engine 344 can maintain some or all currently open activities as a putative task. When the user ceases one or more of the activities, including shutting down or logging of a computer device, the user can be prompted to create a formal task record for the putative task, including editing the activities associated with the putative task. If the user elects not to create a task record, the information for the putative task can be deleted. Information regarding putative tasks can be displayed to a user in displays of user tasks, activities, and navigational mnemonics, and the user given the option to delete the putative tasks or convert the putative tasks to task records.

For example, a user may be working on a project using a web browser, a presentation authorizing program, a word processor, and a database program. The user may also be listening to music and have a communications program running. A software service (which can be an operating system component or another component), such as the activity engine 344, can track these activities as a putative task. If the user enters a command to shut down the computer device, the user can be prompted to save the putative task, including editing the activities in the task. The user may, for example, leave the project-related activities in the task, but may remove one or both of the music program and the communications program from the task. The user can then save the task, giving the task a name (e.g., equivalent to a file name), or can use a default name provided in the prompt.

As discussed above, the activity engine 344 may be in communication with the aggregation/synchronization component 320, and may also be in communication with the computer devices 308. Information regarding tasks, activities, history records, and navigational mnemonics created on the computer device 332, or received from the aggregation/synchronization component 320 or the computer devices 308, can be stored in a database 364. In at least some aspects, the database 364 serves to cache a portion of the information of the aggregation/synchronization component 320 (or the database 324), where the aggregation/synchronization component (or the database 324) remains the authoritative repository of activity and navigational mnemonic information. In other aspects, the database 364 can include additional functionality.

The database 364 can periodically be garbage-collected, such as to remove user task, activity, and navigational mnemonic information older than a particular threshold date, or relating to activities in which the user has not been actively engaged, or navigational mnemonics that the user has not used, for a period of time. In some cases, rather than being garbage-collected, or at a stage prior to being garbage collected, individual records can be combined or merged. For example, all relevant history records can be maintained for recent user activity. For older user activity, individual history records can be combined-such as combining individual history records for a day into a single history record, combining all history records for a week into a single history record, etc. Entries older than a particular threshold can simply be deleted.

The computer device 332 includes a user interface 368 that can allow a user to view information regarding their tasks and activities in conjunction with one or more navigational mnemonics, and optionally resume tasks and activities, access content associated with tasks and activities, or modify, create, or delete task records, or modify activity records or history records. The user interface 368 can include one or more templates 372 specifying various ways the user may view or interact with task, activity, and navigational mnemonic information. The user interface 368 can also include a rules engine 376, which can determine the appropriate content to provide for a particular template 372 in response to a particular user request. A display engine 380 of the user interface 368 can render displays for output, such as to a buffer 382, based on the templates 372 and, at least for some templates, data specified by the rules engine 376.

The user interface 368 can be associated with a query engine 384. The query engine 384 can receive queries from a user (or specified in a template 372) and query the database 364 for relevant data. In some cases, the query can be for tasks, activities (or individual history records thereof), or navigational mnemonics meeting particular criteria, such as being conducted before or after a certain date, have a particular keyword in the title, being associated with particular content or a particular application, having a particular type (e.g., productivity, entertainment, games, movie, etc.), or combinations thereof. In addition, or instead of, specifying a query with regard to a task or activity, a user can be allowed to search for activities using navigational mnemonics. For instance, a user may formulate a query such as "show me the document I was working on before I met with Colleen" or "what was that song I listened to after I got coffee last week?" Another query might be "Show me all of my recent communications with Ken." The query engine 384 can include logic to convert informal or freeform queries provided by a user into a format (e.g., in the structured query language) that can be processed by the database 364.

In some cases, the computer device 332 can include an indexer 386. The indexer 386 can index information regarding tasks, activities, history records, and navigational mnemonics of the database 364, such as to improve performance of the user interface 368 by making data for populating a template 372 more readily available.

The architecture 300 can include more or fewer components than shown, and may be organized in other manners. For example, functionality of a particular component can be carried out by another component. In addition, in at least some cases, functionality can be carried out using multiple components. At least certain functionality shown as occurring at the computer device 332, such as the functionality of the processing engine 360 or the activity engine 344, can be carried out at the aggregation/synchronization component 320.

Data Structure for User Task, Activity, and Navigational Mnemonic Information

Figure 4:
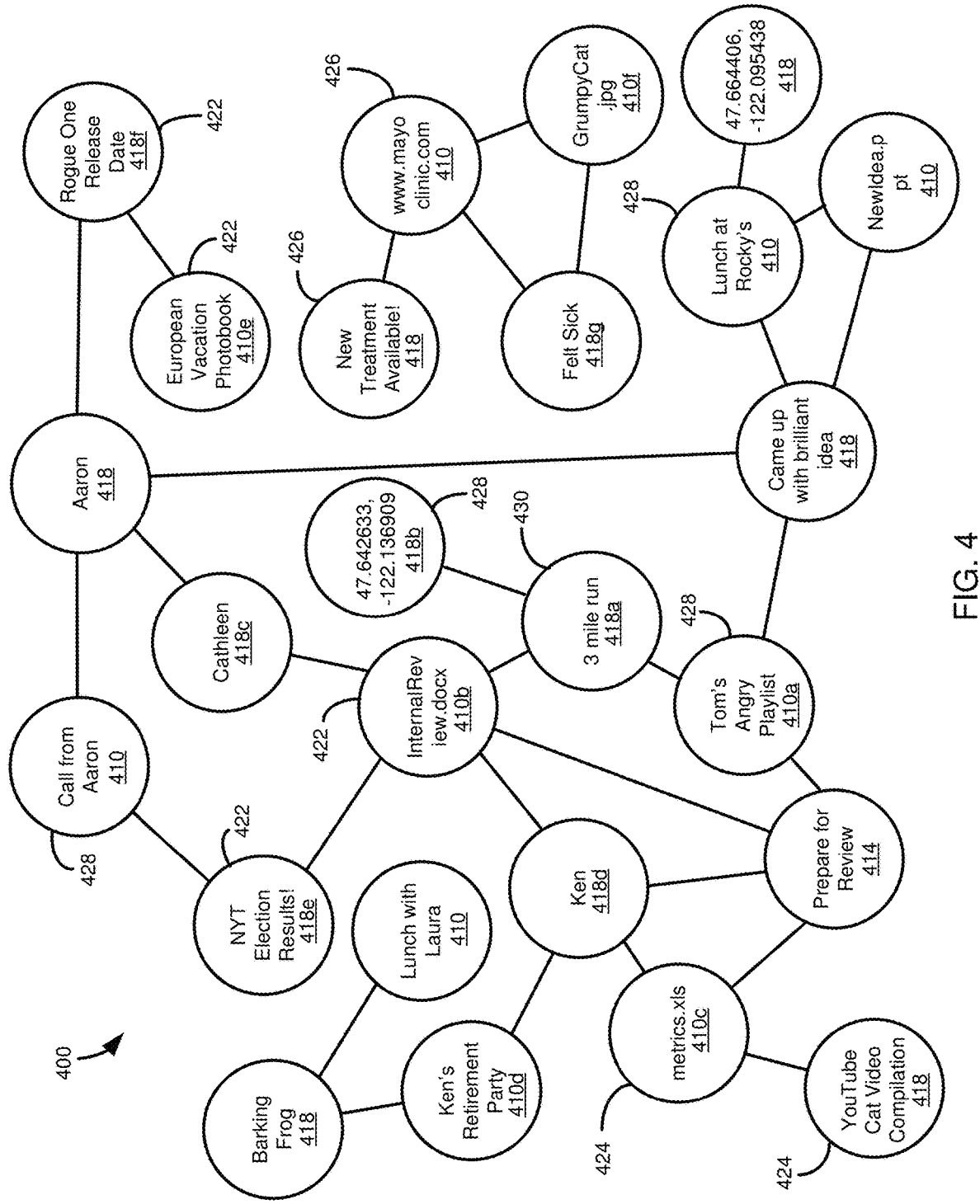
FIG. 4 is a graph illustrating relationships between tasks, activities (including individual history records for an activity), and navigational mnemonics.

In at least some aspects, the relationship between tasks, activities, and navigational mnemonics can be represented as a graph, both conceptually and in terms of a data structure that can be used to store and manage information regarding tasks, activities, and navigational mnemonics. FIG. 4 illustrates an example graph 400 that includes vertices (or nodes) representing activities 410 (which can be activities or individual history records for an activity), tasks 414 (where connected activities can represent activities in a set or collection associated with the task), and navigational mnemonics 418. Relationships or associations between vertices are represented by the presence of an edge between vertices. Edges are typically undirected, but can be directed if appropriate for a particular relationship or association.

FIG. 4 illustrates how a graph 400 can include both activities 410, tasks 414 (which can include activities from multiple devices), and navigational mnemonics 418 from multiple devices, and how providing this information to a user can aid the user in locating tasks and activities of interest. For example, vertices 422 may be associated with a desktop computer, vertices 424 may be associated with a laptop computer, vertices 426 may be associated with a tablet computer, vertices 428 may be associated with a smartphone, and vertex 430 may be associated with a wearable technology, such as a fitness band or a smartwatch. Combining activities 410, tasks 414, and navigational mnemonics 418 from multiple devices not only provides more information to a user, but can allow a user to more easily locate information of interest.

As an example, a user may have run three miles (vertex 418*a*), as measured by a fitness band, at a location (vertex 418*b*) while listening to music (vertex 410*a*) on their smartphone. Before going on the run, the user may have been working on a document (vertex 410*b*) for a project (vertex 414, a task). The project (414) may be associated with other activities, such as a spreadsheet (vertex 410*c*) and a playlist (vertex 410*a*) the user likes to listen to while working on the project. The project (414) and the document (422*a*) may each be associated with additional navigational mnemonics, such as people (vertices 418*c*, 418*d*) who are also involved with the task or activity. In turn, those navigational mnemonics can be associated with additional activities 410, task 414, navigational mnemonics 418, or combinations thereof.

For instance, navigational mnemonic "Ken" (418*d*), is also associated with an activity 410*d*, a retirement party being held (or that was held) for Ken. Note that while "Ken" (418*d*) is a navigational mnemonic associated with the task 414, the document 410*b*, and the party 410*d*, the party is not otherwise related to the task or the document, and "Ken" is not an activity, even though he is a participant in the party and may be a collaborator for the task and the document.

FIG. 4 also illustrates how navigational mnemonics 418 can come from various sources. The three mile run 418*a* may be a navigational mnemonic automatically created by the fitness band (or an application on another computer device in communication with the fitness band). The three mile run 418*a* occurred at a location 418*b*, and that location may be automatically determined (such as by a monitoring component, such as a shell monitor that monitors hardware sensors of the fitness band or the smartphone used to listen to music 410*a*).

Vertex 418*e* can represent a navigational mnemonic suggested by feed service (e.g. feed service 326 of FIG. 3). As another example, based on a profile of a user associated with the graph 400, vertex 418*f* may be suggested as a navigational mnemonic for an activity 410*e* of the user preparing a photobook of their recent European vacation. The navigational mnemonic 410*e* may be a movie that was released during the European vacation, or when the user created the photobook. The navigational mnemonic 410*e* for the movie can be associated with content, such as a link where the movie can be viewed.

As another example, if user activities (or other navigational mnemonics) indicate that the user may be ill, a navigational mnemonic of a suggested news article regarding a potential treatment can be provided to the user (and associated with the appropriate activities or navigational mnemonics). A user can manually add navigational mnemonics, such as a mnemonic 418*g* indicating that the user did not feel well, and can associated an activity, such as viewing a grumpy cat image 410*f*, with the navigational mnemonic.

In addition to specifying a relationship between vertices, edges can represent (or include information useable to indicate) a type of relationship between vertices. For example, a navigational mnemonic 418 may be related to an activity or another navigational mnemonic because they occurred in temporal proximity, or the relationship may be because they occurred at the same location, or involved one or more of the same people (e.g., a person who was a collaborator on a document and to whom a phone call was made). The relationship can be another type of relationship. In other cases, the edges do not include information about relationships, and the relationship can be determined, for instance, based on information associated with records for the activities 410, tasks 414, and navigational mnemonics 418.

Display of User Task, Activity, and Navigational Mnemonic Information

Figure 5:
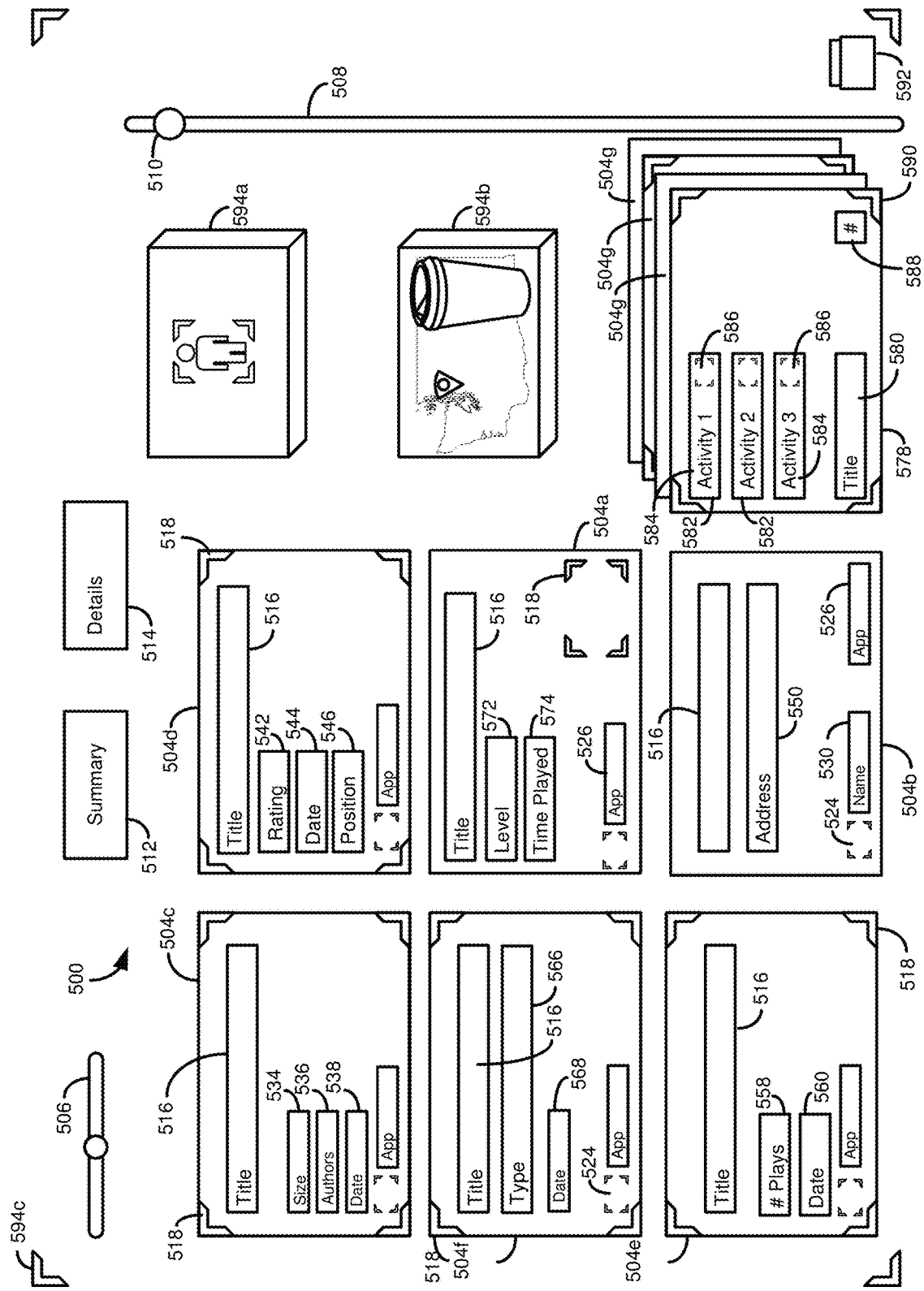
FIG. 5 is an example screen displaying a summary of a user's tasks and activities in relation to a plurality of navigational mnemonics.

FIG. 5 illustrates an example user interface display 500 that can be used to present a user with information regarding their tasks and activities in association with one or more navigational mnemonics. The display 500 can be one of the templates 372 of the user interface 368 of FIG. 3, and can be populated using the rules engine 376 and the indexer 384.

The populated display can be rendered for display to a buffer, such as using the display engine 380 and the buffer 382.

The display 500 presents a plurality of activity representations 504 (e.g., 504a-504f). Each activity representation 504 provides information about an activity in which the user engaged in over a period of time. The activity representations 504 can provide information corresponding to a single instance of the activity (e.g., corresponding to a single history record) or can include information derived from multiple instances of the activity (e.g., information from multiple history records associated with the same activity).

The display 500 can represent a summary view of user activity, where only the most relevant activities over a time period are displayed. In at least some implementations, the display 500 can include tasks and activities carried out at multiple computer devices, including a computer device other than the computer device on which the display is rendered. Although not shown, if desired, an activity representation 504 can display an indicator of which device the activity was carried out on, or can otherwise be displayed in a manner to provide such information.

In some cases, the time period (or other display window parameter) can be adjusted, such as using user input, such that a particular screen state (e.g., corresponding to a position on a timeline, such as represented by a position on a scrollbar 508) represents a longer or shorter time window. Longer time windows may include a larger number of activity representations 504. If the window is larger, and includes a larger number of activity representations 504, the size of the activity representation can be made smaller to accommodate a display of more activity representations on the display 500. Or, the size of the activity representations 504 can be maintained, but the number of relevant activity representations, such as by showing only activity representations meeting a higher threshold relevance level. In some cases, a user interface element, such as the scrollbar 506, can be provided to allow a user to change the relevance criteria, or time window, used to select activity representations 504 to include in the display 500.

The activity representations 504 can be positioned on the display 500 in a particular order. In some cases, the order can be chronological (e.g., chronological or reverse-chronological). In other cases, the order can be based on relevance, with more relevant activity representations 504 being listed before less relevant activity representations. When activity representations 504 are listed in an order, the order may be defined as desired. In particular examples, activity representations 504 are listed in the order from left to right, and then from top to bottom. For instance, for reverse-chronological order, the most recent activity representation 504 would be placed at the top left corner of the display 500, and additional activity representations would be placed in the row left to right accordingly to their recency. Once a row is filled, the process would be repeated starting at the leftmost position of the next lower row.

A scrollbar 508 can including a positional indicator 510, indicating a currently displayed timeline position or value. A user can select the indicator 510 and adjust its position to view more or less recent activity representations 504, such as by clicking and dragging the indictor, or though other input using a pointing device, keyboard, or other input device. The activity representations 504 displayed on the display 500, as well as their position, can change as the position of the indicator 510 changes.

A user may be given the option to view their activities in another format (e.g., using another template 372). The user may be given the option to select the current, summary, view (e.g., the display 500) using an icon 512, and an alternative view, such as a detail or verbose view providing a view of more, including all, of the user's activity by selecting an icon 514.

In some cases, a user can select to resume an activity associated with an activity representation 504 (or an activity representation provided in another display or interface of the present disclosure) by selecting (e.g., clicking or an analogous input) an activity representation or a particular portion of an activity representation. Resuming an activity can include launching an application associated with the activity representation 504, loading relevant content, and resuming a prior state of the application with respect to the content. Resuming an activity can include resuming the activity at a computer device other than the device on which the display 500 is presented (e.g., an application may be launched on a smartphone when a user selects an activity representation 504 displayed on a desktop computer). Or, resuming an activity can include resuming the activity on a computer device other than the device on which the activity was originally, or last, carried out (e.g., an activity last carried out on a smartphone can be resumed on a desktop computer). When the activity is resumed on a different computer device, resuming the activity can include one or more of installing an application on the computer device where the activity will be resumed, transferring content to the computer device where the activity will be resumed, and transferring application state information to the computer device where the activity will be resumed.

The display 500 can display a variety of information in each activity representation 504. Each activity representation 504 typically includes a title 516. The title 516 can be the value specified by the title 228 of FIG. 2 (or, in other cases, the value specified by the titles 208 or 262), which can be a default value, or can be supplied in another manner (e.g., a default value that is not specified by value of the title 228). The title 516 can vary depending on the type of application or content associated with the activity representation 504.

Activity representations 504 can optionally include a displayed image 518 that is associated with the activity of the activity representation 504 (e.g., the image specified by fields 230 or 208 of FIG. 2). In some cases, such as in activity representation 504c, the image 518 can form the background of the activity representation (e.g., being displayed behind the entire display area used to display information regarding a particular activity representation 504). In other cases, such as in activity representation 504a, the image 518 can occupy less than all of the display area used to display information regarding a particular activity representation 504. In some cases the image 518 can be a single static image, in other cases, the image can change between different images, or can include a short video or animation.

Typically, an activity representation 504 includes information regarding an application used (or useable) to engage in the activity associated with the activity representation. For example, the activity representations 504 can include an icon 524 (e.g., an image, such as specified in field 240) representing, or otherwise associated with, the application. The name 526 (e.g., the name specified in field 238) of the application can also be displayed on the activity representation 504. In at least some cases, such as in the case of an activity representation 504b associated with web browsing activity, the icon 524 can represent a web page associated with the web browsing activity of the activity representation (e.g., an image extracted from or otherwise associated with a particular website represented in the activity representation), and, in addition to the name of the application, a name 530 of the website (e.g., a host name, which may be stored, for example, in the Properties field 292) can be displayed on the activity representation. In particular aspects, the web page icon or image 518 and the web page name 530 are extracted from metadata associated with the webpage (and may correspond, for example, to an image and name displayed in a title bar of the web browser when the user visited the web page).

Activity representation 504c can represent activity involving a document, such as a presentation document, a word processing document, or another type of document. The title 516 of the activity representation 504c can be the name of a file corresponding to the document, optionally including the file path. The activity representation 504c can provide details regarding the file, such as its size 534, one or more authors 536 of the file, and a date 538 the file was created or last modified. The image 518 in the activity representation 504c can be, for example, a portion of the contents of a document associated with the activity representation.

Activity representation 504d can represent a user viewing a video. The title 516 can be the name of the video (e.g., a name of a movie or a television program). The activity representation 504d can include additional information regarding the video, such as a rating 542 (for instance, an MPAA rating, a popularity rating, or a critical rating), a date 544 the video was produced (or, alternatively, a date the video was last viewed), and a position 546 at which the user previously ceased viewing the video. The image 518 displayed with the activity representation 504d can be a frame of the video or a particular image associated with the video (e.g., equivalent to a movie poster).

Activity representation 504b, as discussed above, can represent a website visited by the user. The title 516 can be a title of the web page (e.g., a title specified in metadata associated with the web page). The activity representation 504b can include additional information about the website, such as its address or URL 550. Although not shown, the activity representation 504b can include additional information about the web page, such as a date the user last visited the webpage or a time spent engaged with the website, which can be a total time spent engaged with the website or the time spent engaged with the website on the date the user last visited the webpage (which can be for a particular date, or for a particular interaction, such as a particular history record associated with the activity representation 504b).

As mentioned above, the activity representation 504b can include an icon 524 that is associated with a website visited as part of the web browsing activity of the activity representation 504b, such as specified by metadata of the website. Although not shown, the activity representation 504b can include an image 518, such as an image of a visited webpage. The activity representation 504b includes, in addition to the address 550, a name 530 associated with the visited webpage and the name 526 of the application (e.g., a specific web browser) used to view the webpage.

Activity representation 504e can represent activity related to audio content, such as a user listening to a song or album. The title 516 of the activity representation 504e can be, for example, the name of the artist and/or name of the song/album. The activity representation 504e can display additional information regarding the audio content, such as a number of times 558 the user played the content, and a date 560 the album or song was released, or a time the user last listened to the album or song. The image 518 displayed for the activity representation 504e can represent artwork designated for the musical content (e.g., corresponding to an album cover).

Some activity representations 504 can relate to photographs viewed, or taken, by a user. For instance, activity representation 504f can represent a single photo viewed by the user or a collection of photos, or a photo of a collection of photos, viewed by the user. The title 516 of activity representation 504f can be a file path for a photo or a name of the collection. The activity representation 504f can include type information 566, which can indicate whether the photo is an individual photo or a collection of photos. If the photo is from a collection, the number of photos in the collection can be displayed. The activity representation 504f can also include a date 568, which can be a date the photo (or a photo of the collection) was taken, or a date the user last viewed the photo (or collection). The image 518 displayed in the activity representation 504f can be the photograph or a photograph of a collection or a collage of photographs in the collection.

Activity representation 504a can represent game play activity by a user. The title 516 of the game play activity representation 504a can be the name of the game. The activity representation 504a can display additional information about the game content played, such as a level or accomplishment 572 last achieved by the user, and a total time 574 spent by the user playing the game. Although not shown in FIG. 5, a game play activity representation 504a can include additional information, such as an amount of game content completed by the player to date, or a date the user last played the game. The activity representation 504a for gaming activity can include an image 518, which can be, for example, a screenshot of the user's last session playing the game, or another image associated with the game (e.g., corresponding to packaging cover art for the game).

The display 500 includes a task representation 578. Although a single task representation is 578 shown, displays (including summary displays, detail displays, displays of search results, or other displays) can include multiple task representations. The task representation 578 can include a name 580, which can be a human understandable title or description of the task, such as the value of the field 206 of the task record 200 of FIG. 2. The task representation 578 can also display a list of activities 582 associated with the task. Each activity 582 can be associated with a title 584 and an icon or image 586. The title 584 can be, for example, the value of the field 228 of the activity record 218 of FIG. 2, and the icon or image can correspond to the image 230 or icon 240 fields.

In some cases, the activities 582 displayed on a task representation 578 can be less than all of the activities associated with the task. For instance, a user may only have a limited number of the activities 582 currently open, or may have only had a limited number of the activities open when the user last engaged in the task associated with the task representation 578. The activities 582 displayed may be the currently open activities, or the activities used in the prior instance of the task associated with the task representation 578. In other cases, all of the activities 582 can be displayed on a task representation 578, or the activities to be displayed can be selected in another manner. The task representation 578 can display a number 588 indicating the number of activities, overall, associated with the corresponding task.

The task representation 578 can be displayed in a particular style, format, or layout, such as specified by the field 216 of the task record 200 of FIG. 2. The style, format, and/or layout can specify which activities 582 are to be displayed on the task representation 578, a color associated with the task representation, and an image or icon 590 (e.g., the field 208 of the task record 200 of FIG. 2) displayed in association with the task representation. As shown, the image 590 forms the background of the task representation 578. However, the image 590 can be displayed in other manners (e.g., as specified in a schema indicated by the field 216), including as a smaller image on the display representation 578.

A user interface associated with the display 500 can provide options for creating or modifying a task associated with a task representation. For instance, the user can select a task creation icon 592 that initiates the creation of a task. Or, a user may choose to select one or more activities and enter a command to create or modify a task (e.g. "right clicking" to pull up a menu and then selecting a "create task" or "add to task" option). Similarly, the interface may provide commands to allow a task representation 578 to be modified, including renaming the task, changing a schema associated with the task, deleting the task, or adding or removing activities 582 to or from the task.

In the interface and display 500 of FIG. 5, in addition to the activities 582 listed on the activity representation 578, activity representations 504g associated with the task representation can be displayed in association with the task representation. In FIG. 5, the task representation 578 and its associated activity representations 504g are shown as a stack. A user may be allowed to selectively expand and collapse the stack, such as to select a particular activity associated with an activity record 504g to resume, or to obtain more information about the activity representations associated with the task representation 578. As described above, the activity representations 504g can represent the specific activities associated with the task representation 578 that a user engaged in during a particular instance of the task, which can be less the all of the activities associated with the task. In some cases, the activity representations 504g are only those activities in which the user actively engaged in that instance of the task associated with the task representation 578. In other cases, the activity representations 504g can be selected in another manner, such as including all of the activity representations associated with the task representation 578 in the stack, even if the user did not engage in all of the activities during that instance of the task.

The activity representations 504 and task representation 578 are shown next to navigational mnemonic representations 594 (e.g., 594a-594c). The navigational mnemonic representations 594 can represent various types of navigational mnemonics, including a person 594a and a location 594b (e.g. a particular coffee shop). Of course, these navigational mnemonics are provided by way of example only, and navigational mnemonic representations 594 can represent any type of navigational mnemonic.

The navigational mnemonic representations 594 can be positioned relative to one or more of the activity representations 504 or task representations 578 using one or more criteria. For instance, if the activity representations 504 and task representations 578 are displayed chronologically, the navigational mnemonic representations 594 can also be displayed chronologically. If the activity representations 504 and task representations 578 are displayed according to a different criteria, the navigational mnemonic representations can be displayed proximate the activity representations to which they are relevant. In particular aspects, the activity representations 504, task representations 578, and the navigational mnemonic representations 594 are organized relative to one another and the collections of navigational mnemonic representations and their associated activity and task representations are then displayed in an order.

The navigational mnemonic representations 594, task representations 578, and activity representations 504 are typically displayed in visually distinct styles, so that a user can discern between them. However, the activity representations 504, the task representations 578, and the navigational mnemonic representations 594 can be displayed in any desired manner. In some examples, rather than having navigational mnemonic representations 594 displayed in a discrete section of the display 500, the navigational mnemonic representations can be interspersed between activity representations 504 and task representations 578. The navigational mnemonic representations 594 can also be displayed in a more transient manner, such as being displayed as, optionally partially transparent, popups when a user navigates to a new series of activity representations 504 and task representations 578 or if the user moves a pointing device to a particular location. For instance, navigational mnemonic representations 594 associated with a particular activity representation 504 may be displayed as popups if the user hovers a cursor over the activity representation, or selects an interface element on the activity representation.

As shown in FIG. 5, a navigational mnemonic representation 594c can be an image that forms the background of the display 500. The navigational mnemonic representation 594c may be useful when it is relevant to all or a substantial portion of the activity representations 504 and task representations 578 currently being displayed. For instance, if the displayed activity representations 504 and task representations 578 are for a particular time period, the navigational mnemonic representation 594c can be associated with that time period. If the user navigates to another time period, the navigational mnemonic displayed in the navigational mnemonic representation 594c can change to a new navigational mnemonic relevant to the new time period.

As discussed above, in at least some aspects, selecting a navigational mnemonic representation 594 can cause a display of information relating to the navigational mnemonic or can generate a new display, such as a display of activity representations 504 and/or task representations 578 organized according to different criteria.

In some cases, a user may be allowed to influence the navigational mnemonic representations 594 included in the display 500. For instance, a user may "pin" one or more activity representations 504 and task representations 578 to one or more navigational mnemonic representations 594. Pinning may result in a permanent (or, at least permanent until the user modifies the association) association between the activity representation 504 and/or task representation 578 and the navigational mnemonic representation 594.

The user can also be given the option to create or define navigational mnemonics 594. For instance, the user may choose a person from a contact list, a location, media content, etc. to serve as a navigational mnemonic for a particular display, or a particular group of activity representations 504 and task representations 578 currently shown in a display. The user may be allowed to pin activity representations 504 and task representations 578 to such user defined navigational mnemonic representations 594.

User activity creating and modifying (including removing) navigational mnemonic representations 594, and associations between navigational mnemonic representations and activity representations 504 and task representations 578, can influence content that is selected as navigational mnemonics and which navigational mnemonics are selected to be displayed as navigational mnemonic representations 594 in association with particular activity representations 504 and task representations 578 on the display. For instance, the user's actions can serve as input for the rules engine 376 or query engine 384 of FIG. 3. Or, the actions can be used to train the association engine 328.

The display 500 can include additional user interface elements. For example, the display 500 can include a search element, where a user can enter search criteria to locate activity representations 504, task representations 578, and navigational mnemonic representations 594 meeting the search criteria.

Although the display 500 is shown as a summary display, where selected activity representations 504 and task representations 578 are displayed (in conjunction with associated navigational mnemonic representations 594), activity representations, task representations, and navigational mnemonic representations can be used analogously in other types of displays. For instance, a display can include all activity representations 504 and task representations 578, or can display activity representations or task representations relevant to search criteria (including search criteria specified relative to a navigational mnemonic).

As will be further described, user interfaces can allow a user to create and edit task representations 578 from a display of activity representations 504 and task representations. In particular, displays of past activities can be used to create tasks. That is, while a task can be created or edited while a user is currently engaging in an activity or task, a user can create a task from the activities, or edit the task, at a later date.

Creation of Task Using Virtual Desktop

Figure 6:
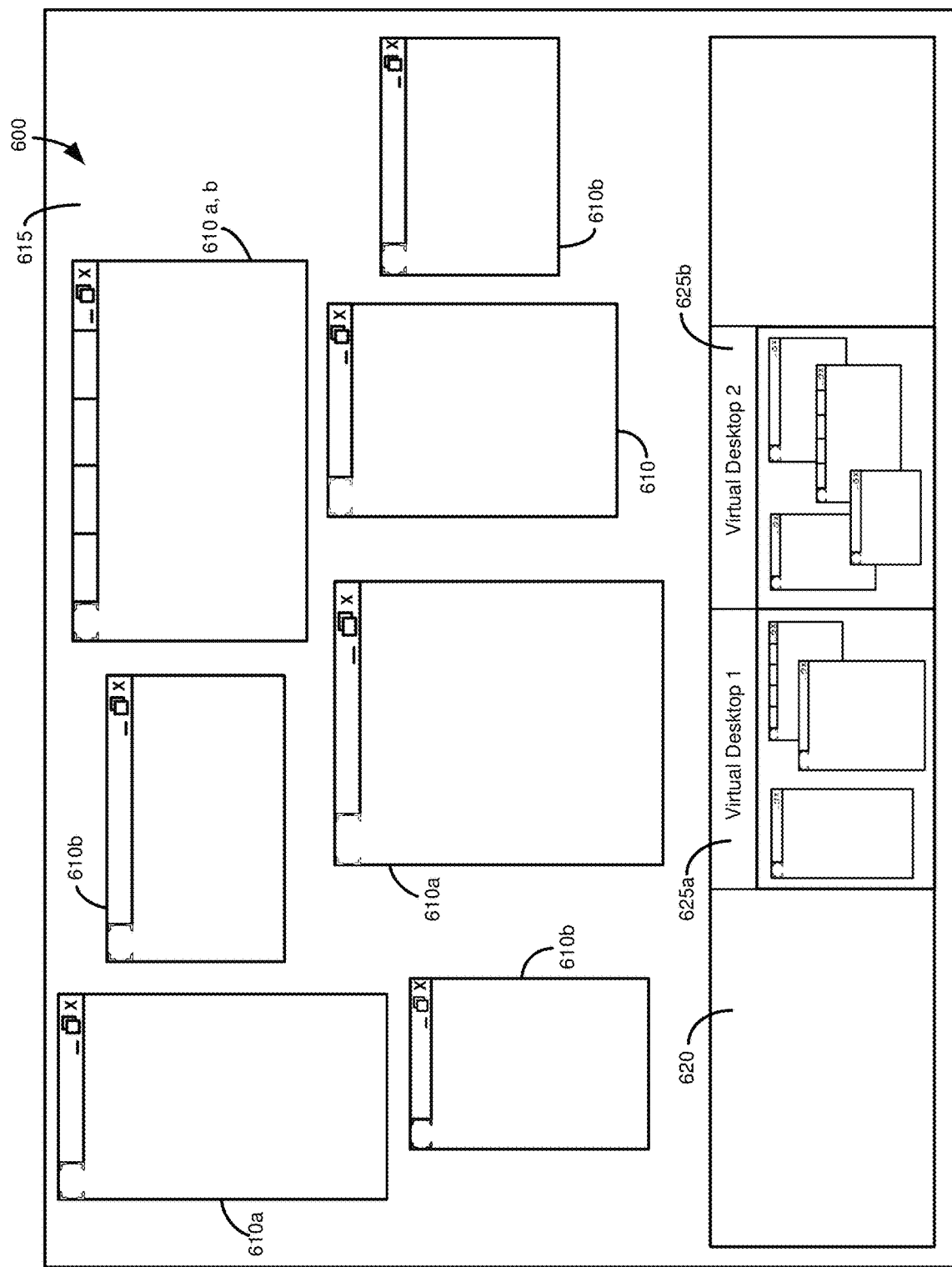
FIG. 6 is an example screen illustrating the creation of tasks by grouping activities in a virtual desktop.

FIG. 6 illustrates a display 600 of a user interface for allowing a user to create tasks, or sets or collections of activities. As mentioned above, an activity can be an application and associated content. Accordingly, the display 600 includes a plurality of applications 610 (e.g., 610a-610b), each with associated content. The applications 610 can be associated with activity records and history records (e.g., the activity records 218 and the history records 248 of FIG. 2). The display 600 can be one of the templates 372 of the user interface 368 of FIG. 3, and can be populated using the rules engine 376 and the indexer 384. The populated display 600 can be rendered for display to a buffer, such as using the display engine 380 and the buffer 382.

The display includes a desktop 615 (e.g. a graphical user interface providing access to a collection of applications running on an operating system (e.g., a graphical shell) along with files and other information that may be displayed on the desktop) and a interaction panel 620 that can be used, among other things, to create and switch between virtual desktops 625. A virtual desktop 625 can be a particular grouping of applications and content that resemble different instances of desktop operating system interfaces, but are merely a visually segmentation of applications and content of a single desktop instance.

In the display 600 of FIG. 6, a user can drag applications 610 into the interaction panel 620 to create a new virtual desktop 625a, 625b (e.g., by dragging to an empty portion of the interaction panel 620) or to add the applications to an existing virtual desktop 625a, 625b. In FIG. 6, applications 610a have been added to virtual desktop 625a, while applications 610b have been added to virtual desktop 625b. A user also may select to delete a virtual desktop 625 from the interaction panel 620, or to remove individual applications 610 from a virtual desktop.

Each of the virtual desktops 625 can be associated with a task, including being associated with a task record (e.g., a task record 200). The task record can include identifiers for the applications 610 associated with the task. Thus, when a new task, or virtual desktop 625, is created, a new task record can be created. Or, when applications 610 are added to, or removed from, the virtual desktop 625, the task record can be updated, and the updated record stored.

When a virtual desktop 625, corresponding to a task, is created, the user can be given the opportunity to customize the task, such as to provide a name, a representative image, and to specify a color or other style or format elements for the task. If the user does not supply a name, a system implementing the display 600, or the task functionality, can supply a default name, can use a default style or layout, and optionally can supply a default image or a suggested image (e.g., an image based on a title of the task, if a title was provided, or a title based on applications or their associated content in the task). In the case of suggested images, content titles, or keywords in the content, can be used to search for representative image (e.g., if a webpage relates to "soccer" an image search can be performed for soccer related images).

Using the interaction panel 620, or another user interface mechanism, a user can switch between virtual desktops/tasks 625, or can return to a desktop (e.g., the desktop 615) that is not associated with a task. For applications 610 that have not been explicitly associated with a virtual desktop/task 625 by a user, a system implementing a task and activity monitoring system can create a temporary task record including the applications 610 currently running on the desktop 615. In some cases, the temporary task record can include less than all of the applications 610 running on the desktop 615. For instance, applications 615 can be selected for inclusion in, or exclusion from, the temporary task record based on rules, including heuristics, or machine learning. If the user chooses to take certain actions, such as logging off or shutting down their computer device, the interface associated with the display 600 can prompt a user to save the temporary task record as a permanent task record. In some implementations, if the temporary task record is not converted to a permanent task record, the temporary task record is deleted. In other implementations, the temporary task record can be retained, at least for a time. When temporary task records are retained, they can periodically be garbage-collected, such as deleting records older than a threshold.

Task Representation with Activity Tabs

Figure 7A:
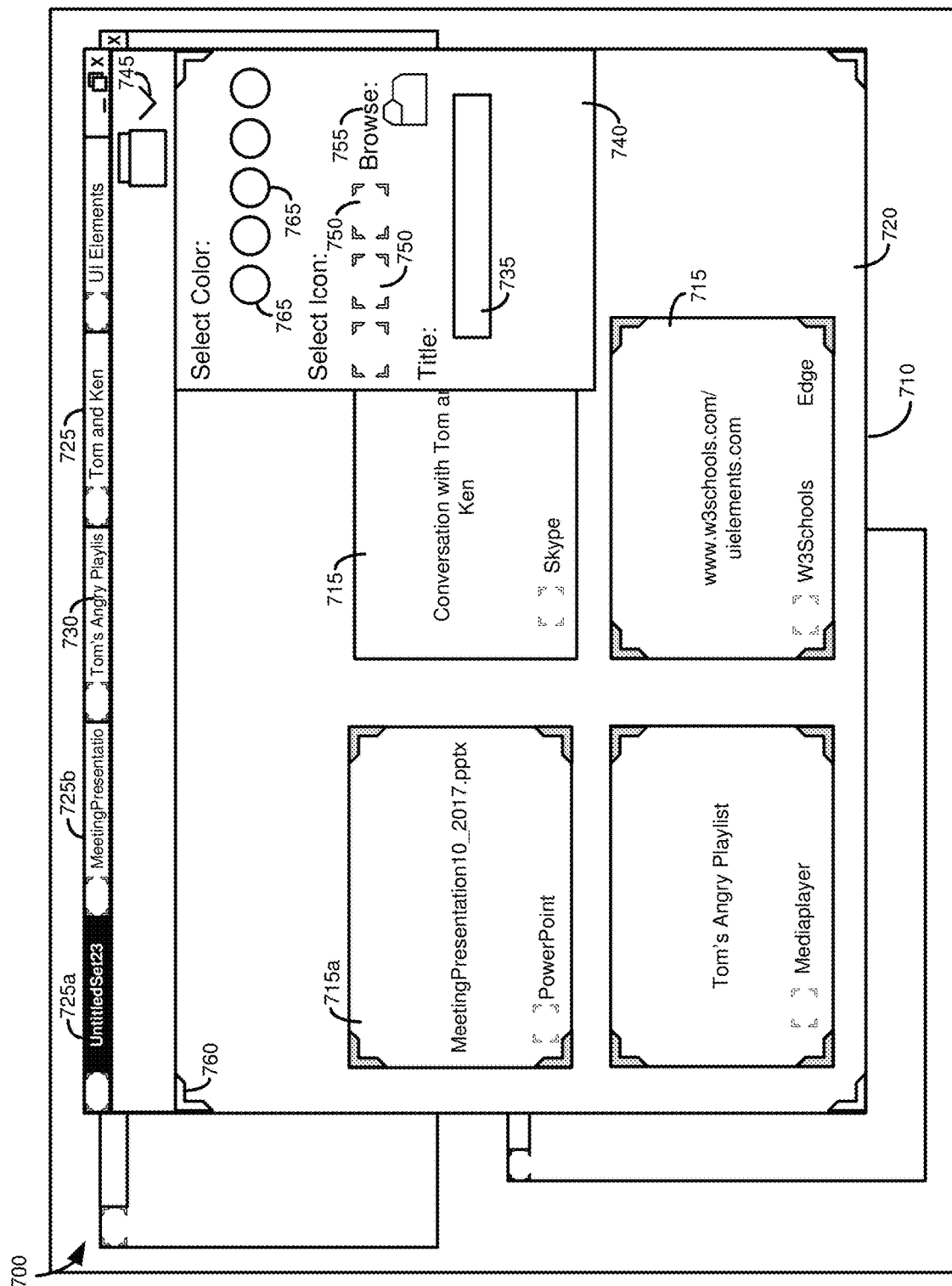
FIGS. 7A and 7B are example screens illustrating a display window having tabs allowing a user to select a task activity to display, or to display an information screen for the task, which can include options for customizing task information.
Figure 7B:
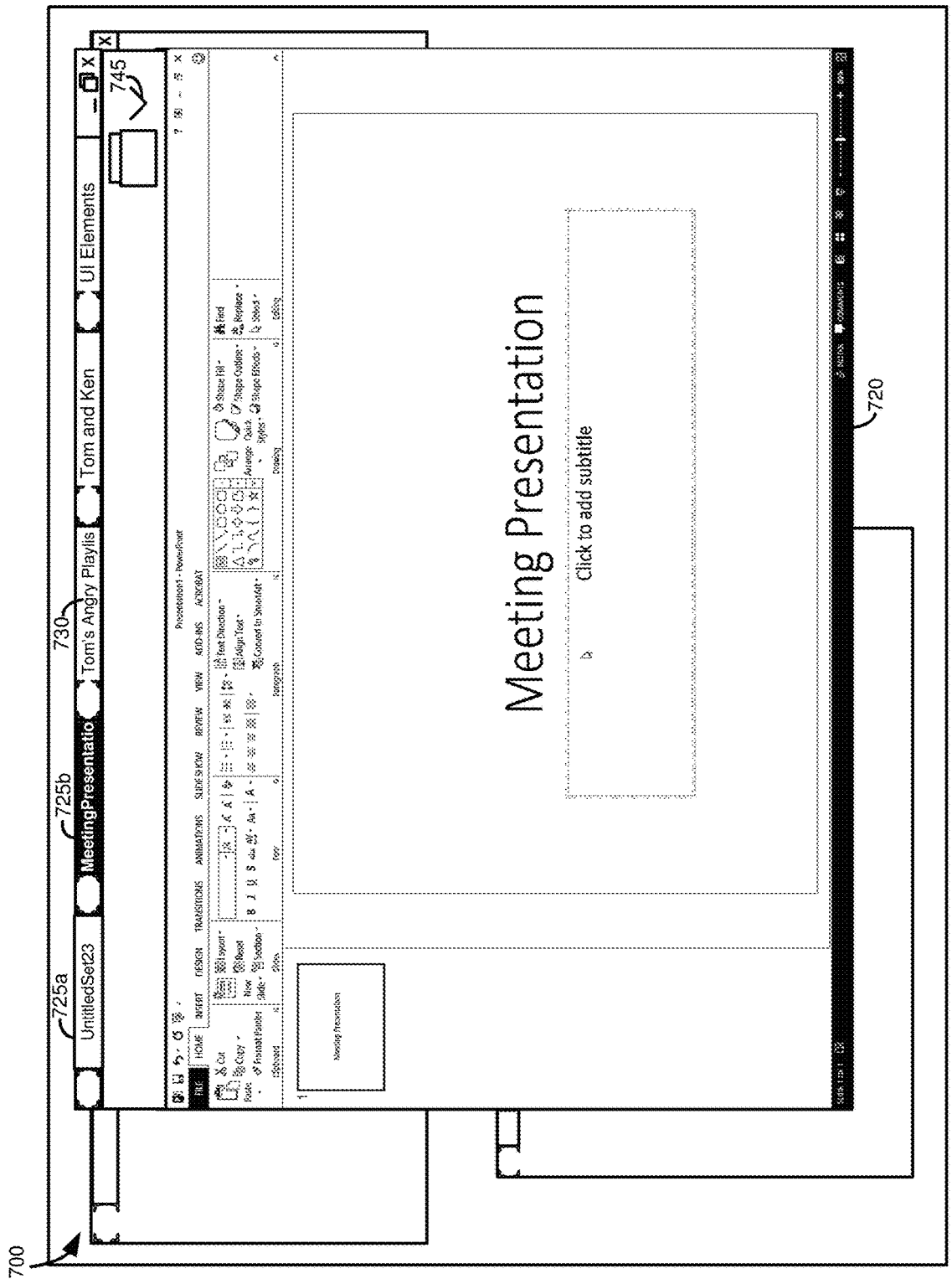

FIGS. 7A and 7B illustrate an example display 700 of a user interface that provides for the creation and management of task records (including as virtual desktops) 710. The task record 710 of FIG. 7 includes a plurality of activity representations 715 for associated activities. The activity representations 715 can be implemented analogously to the activity representations 504 of FIG. 5. The display 700 can be one of the templates 372 of the user interface 368 of FIG. 3, and can be populated using the rules engine 376 and the indexer 386. The populated display 700 can be rendered for display to a buffer, such as using the display engine 380 and the buffer 382.

The task record 710 is displayed in a window 720. The content displayed in the window 720 can be changed from the task record 710 to an activity of the activity representations 715 by selecting an appropriate tab 725 located at the top of the window. For instance, FIG. 7B illustrates the display 700 after selecting a tab 725*b* corresponding to activity representation 715*a*.

In some cases, a task record 710 can include activities that are not currently executing. For example, while a number of activities may be associated with a task, a user may not wish to engage in all of the activities every time the user engages in the task (e.g., for computer performance reasons, it may be better not to resume activities in which the user does not intend to engage). In such cases, the activities that can be selected via a tab 725 may be different than the activity representations 715 displayed in the window 720 by selecting the tab 725*a* for the task record 710. That is, for example, a user may be able to close an application associated with an activity by closing the corresponding tab 725. However, closing the application/activity does not result in the activity representation 715 being removed from the task record 710. The full list of activity representations 715 associated with the task record 710 can be accessed by viewing the window for the task record 710 by selecting the tab 725*a*. An activity can be resumed by selecting the corresponding activity record 715 from the task record 710 (which can launch the application in the window 720, associated with a new tab 725).

FIG. 7A illustrates how a user may customize an activity record 710. Currently, as shown on tab 725*a*, the task record 710 has a system-assigned, default name. The user can change the name associated with the task record 710 by entering a name in title field 735 of a formatting window 740 that can be instantiated by selecting a user interface element 745. The new title can be stored in association with the task record 710 (e.g., in field 206 of task record 200 of FIG. 2).

The user may be able to select an image to be associated with the task record 710 using the formatting window 740. For instance, the formatting window 740 can provide default or suggested images or icons 750 to associate with the task record 710, or the user can select a custom image by selecting a browse user interface element 755 (e.g., allowing a user to browse for a particular image file). The selected image or icon can be displayed in association with the task record 710, including as a background 760 for the task record 710.

The formatting window 740 can allow a user to specify other format, layout, or style properties for the task record 710. In particular, the user may be allowed to select from user interface elements 765 specifying a color to be associated with the task record 710, including displayed as a background color for the window 710 or in association with other representations of the task record 710.

Task Creation by User-Selection of Activities

Figure 8:
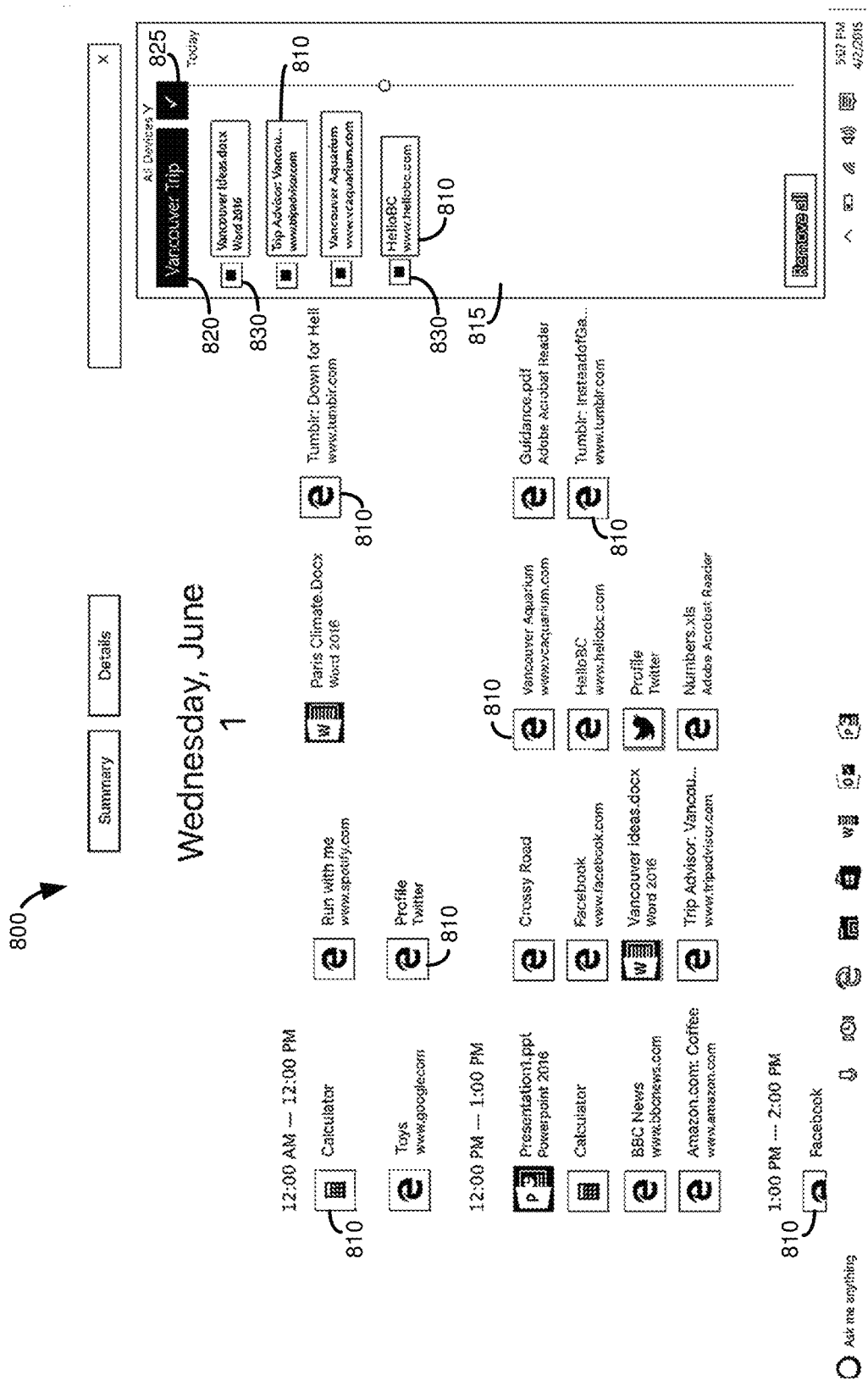
FIG. 8 is an example screen illustrating the creation of a task record that includes a plurality of activities.

FIG. 8 illustrates an example display 800 associated with a user interface provided by an aspect of the disclosed innovations. The display 800 includes a plurality of activity representations 810, which can display a portion of the information of the activity records 218 of FIG. 2. The display 800 can be one of the templates 372 of the user interface 368 of FIG. 3, and can be populated using the rules engine 376 and the indexer 384. The populated display 800 can be rendered for display to a buffer, such as using the display engine 380 and the buffer 382.

The user can select activity representations 810 (e.g., by multi-selecting them with a pointing device) and provide a command to create a new task (e.g., by right-clicking to bring up a menu, and selecting an option to create a new task). The user can be provided with a window 815 that includes a field 820 in which to enter a title, and an element 825 to instantiate a task record that includes the selected activity representations 810.

User interface elements 830, such as checkboxes or radio buttons, can be provided to allow a user to select and de-select activity representations 810 to include in the task record. A user interface element 830 can allow a user to remove all of activity representations 810 from the window 815. A user can be allowed to add additional activity representations 810 to the window 815, such as by clicking and dragging them into the window, or by selecting the activity representation, bringing up a menu, and selecting an appropriate command from the menu.

Creation of Task by Activity Stacking and Options for Task Resumption

Figure 9:
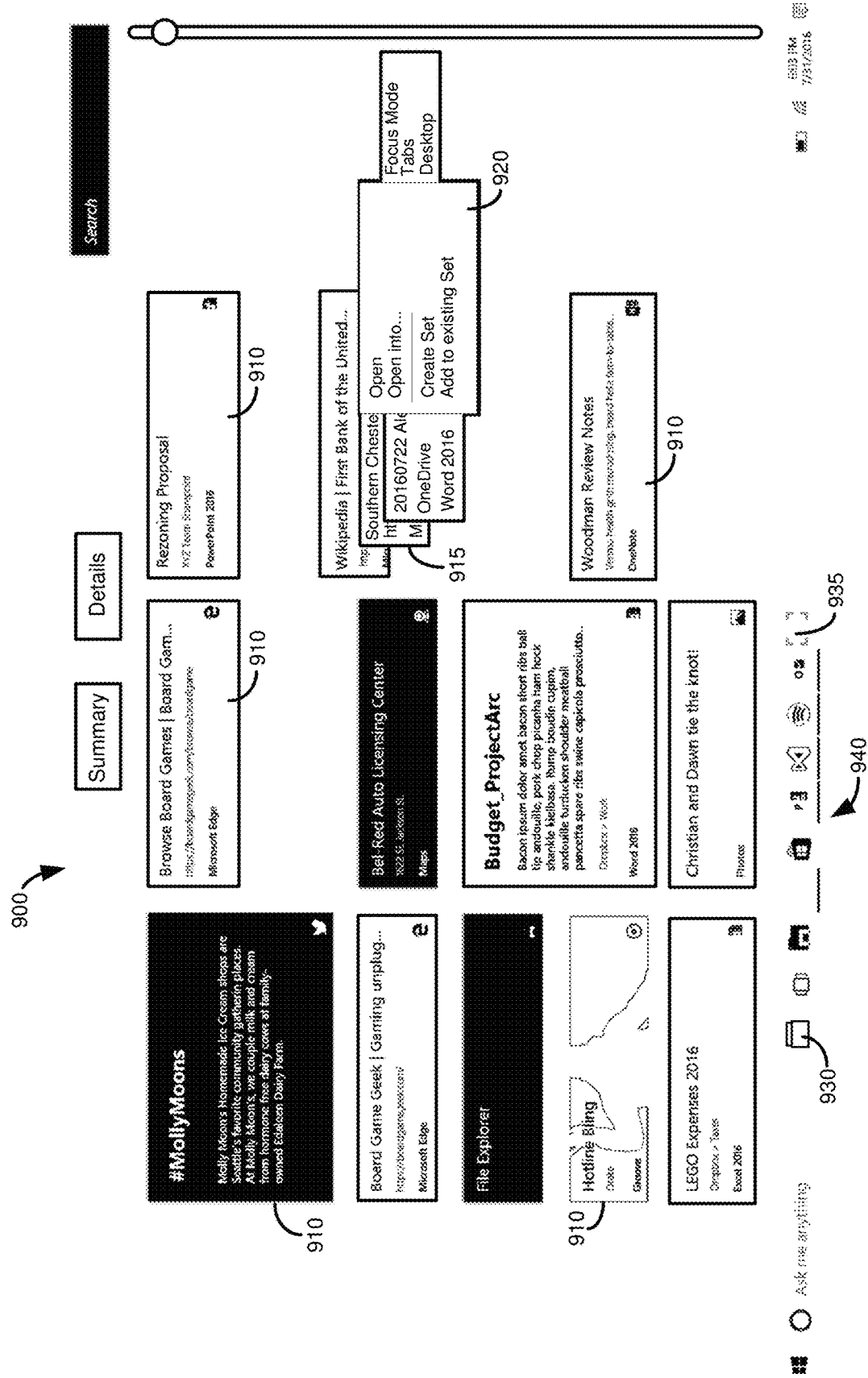
FIG. 9 is an example screen illustrating the creation of a task record by dragging activity representations on top of one another, and options for opening a task, creating a task, or adding activities to an existing task.

FIG. 9 illustrates an example display 900 associated with a user interface provided by an aspect of the disclosed innovations. The display 900 illustrates how activity representations 910 can be added to an existing task record, or selected to be included into a newly created task record. The display 900 also illustrates how a task record 915 can be activated using activation information from the associated activity representations 910 to resume the activities associated with the task record 915. The display 900 can be one of the templates 372 of the user interface 368 of FIG. 3, and can be populated using the rules engine 376 and the indexer 386. The populated display 900 can be rendered for display to a buffer, such as using the display engine 380 and the buffer 382.

The activity representations 910 and the task record 915 can display information associated with the activity records 218 (or history records 248) and task records 200 of FIG. 2. The display 900 can be organized at least generally as described for the display of FIG. 5. Although navigational mnemonics are not shown, the display 900 can include navigational mnemonics, if desired.

The display 900 includes a menu 920 that includes actions that a user may take regarding an activity representation 910 or a task record 915. A user may create a new task record 915, or add activity representations 910 to, or remove them from, a task record by dragging the activity representations onto or off of a stack of activity representations.

For a task record 915, a user may open the task record, which may, for example, bring up a display analogous to FIGS. 7A and 7B. The user may be permitted to select other options from the menu 920 to open the task record 915, such as into a focus mode (e.g., having single applications of the task in focus at one time), into a tabbed mode (e.g., as in the display 700), or into a desktop (e.g. a virtual desktop, or activating all of the activities into a current desktop environment).

For activity representations 910, the menu 920 can provide options to add selected activity representations to a task, or to create a new task with the selected activity representations. In some cases, along with activity records 910, tasks 915 may be added to other tasks. Although not shown in FIG. 9, a display 900 can include navigational mnemonics, which can be part of a task, can be added to an existing task, or can be added to a task to be created.

The display 900 can include a user interface element 930 that allows a user to create new tasks. The element 930 can be analogous to the element 592 of FIG. 5. As described above, in some aspects of the disclosed innovations, tasks can be associated with, or assigned to, various user interface elements, such as using a "pinning" modality. The display 900 shows a task icon or image 935 pinned to a taskbar user interface element 940.

Method for Creating Task Record

Figure 10:
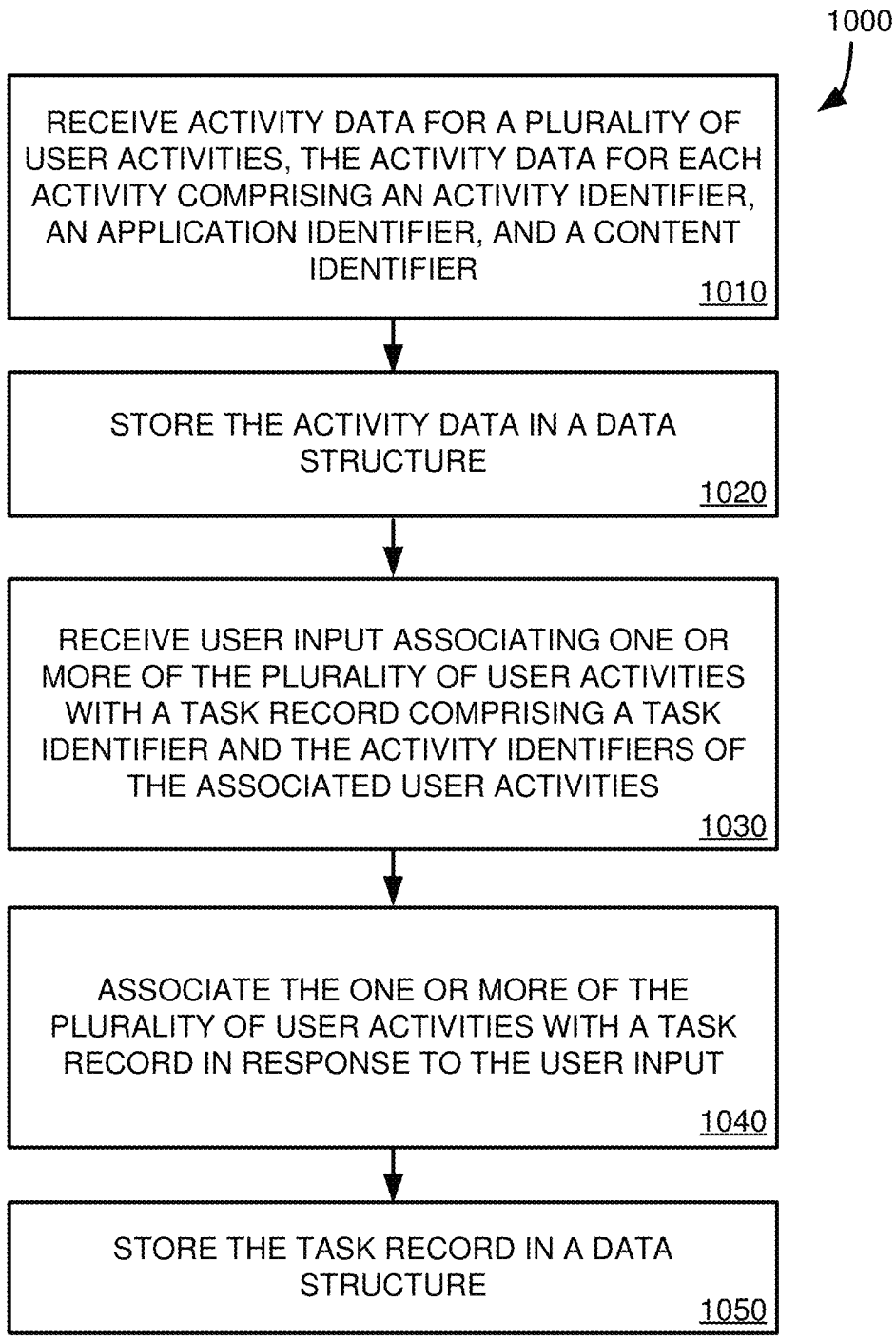
FIG. 10 is a flowchart of an example method for creating a task record associated with one or more user activities.

FIG. 10 illustrates a method 1000 for creating a task record for one or more user activities. The method 1000 can be carried out using the architecture 300 of FIG. 3 and the data model of FIG. 2. At 1010, activity data is received for each of a plurality of user activities. The activity data for each user activity includes an identifier that identifies the particular activity, an application identifier, and a content identifier. The activity data is stored in a data structure, such as a queue, list, stack, heap, tree, or graph, at 1020.

At 1030, user input is received associating one or more of the plurality of user activities with a task record that includes a task identifier and the activity identifiers of the associate user activities. The one or more of the plurality of user activities are associated with the task record in response to the user input at 1040. At 1050, the task record is stored in a data structure, such as a queue, list, stack, heap, tree, or graph. In some cases, the data structure that stores the task record is the same data structure that stores the activity data.

Method for Rendering Display with Task Representation

Figure 11:
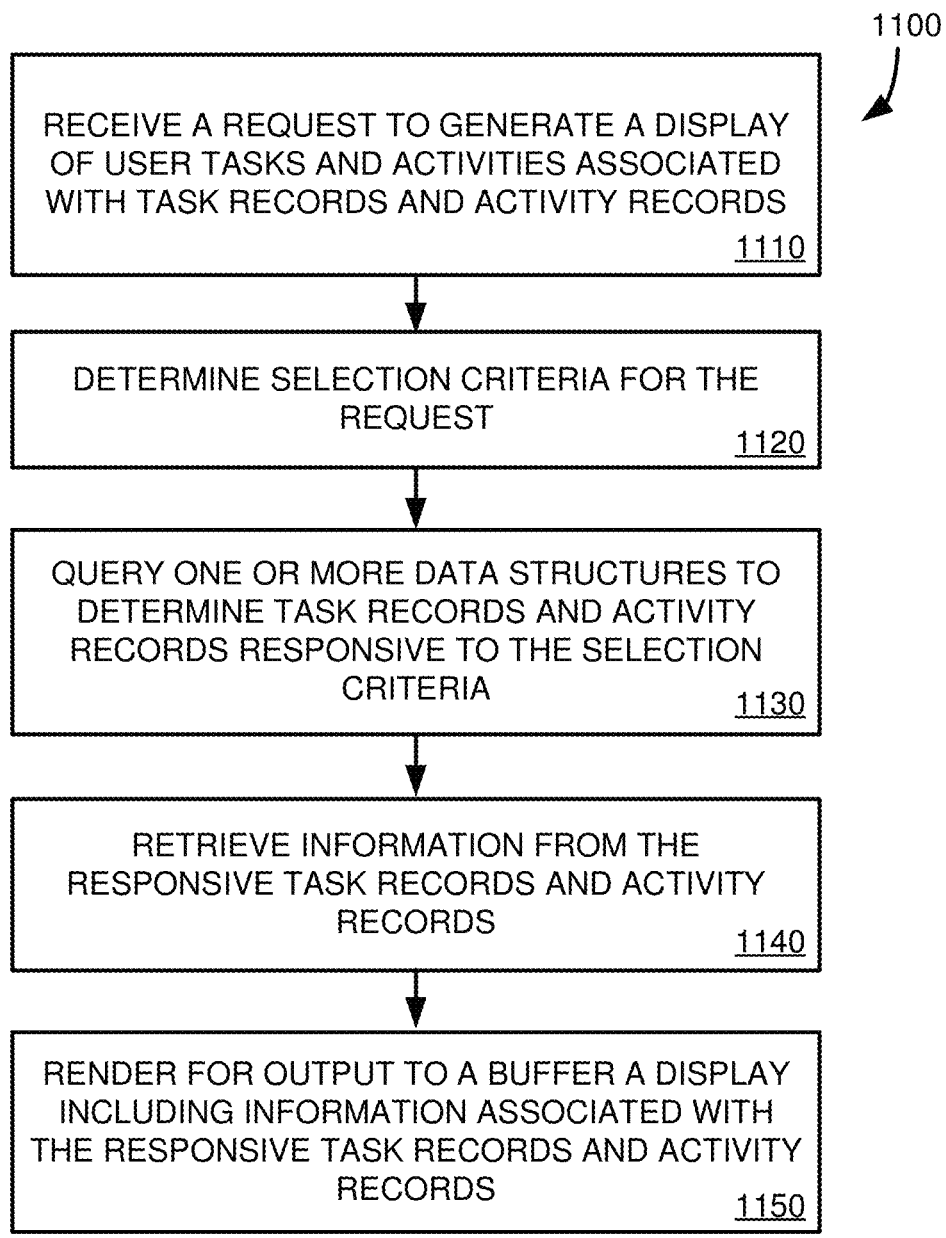
FIG. 11 is a flowchart of an example method for displaying information associated with selected task and activity records.

FIG. 11 illustrates a method 1100 for rendering a display that includes a task representation. The method 1100 can be carried out using the architecture 300 of FIG. 3 and the data model of FIG. 2. At 1110, a request is received to generate a display of user tasks and activities associated with task records and activity records. Selection criteria for the request is determined at 1120. The selection criteria can be, for example, a time, a navigational mnemonic, or a keyword or search query.

At 1130, one or more data structures are queried to determine task records and activity records responsive to the selection criteria. The one or more data structures store a plurality of task records and a plurality of activity records. Information from the responsive task records and activity records is retrieved at 1140. At 1150, a display is rendered for output to a buffer. The display includes information associated with the responsive task records and activity records.

Method for Sending a Task Record to Another Computer Device

Figure 12:
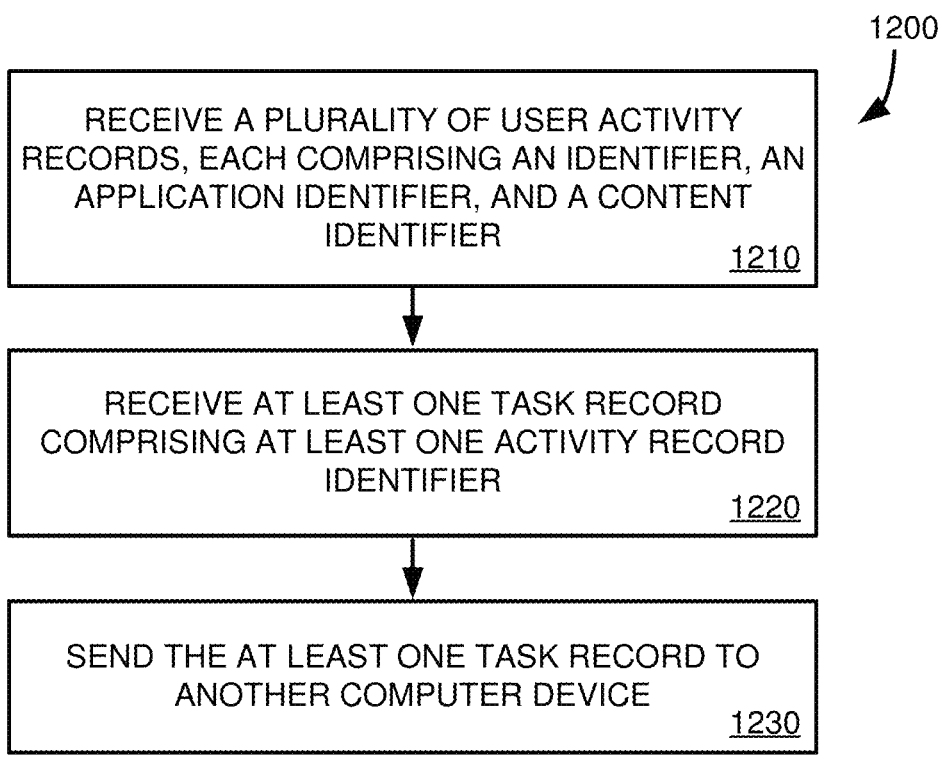
FIG. 12 is a flowchart of an example method for sending a task record from one computer device to another computer device.

FIG. 12 illustrates a method 1200 for displaying a task representation for a task record and information for an activity record of an activity associated with the task record. The method 1200 can be carried out using the architecture 300 of FIG. 3 and can use the data model of FIG. 2. At 1210, a plurality of user activity records are received. Each activity record includes an identifier for the activity record, an application identifier, and a content identifier.

At least one task record is received at 1220. The at least one task record includes at least one activity record identifier. The at least one task record is sent to another computer device at 1230.

Computing Systems

Figure 13:
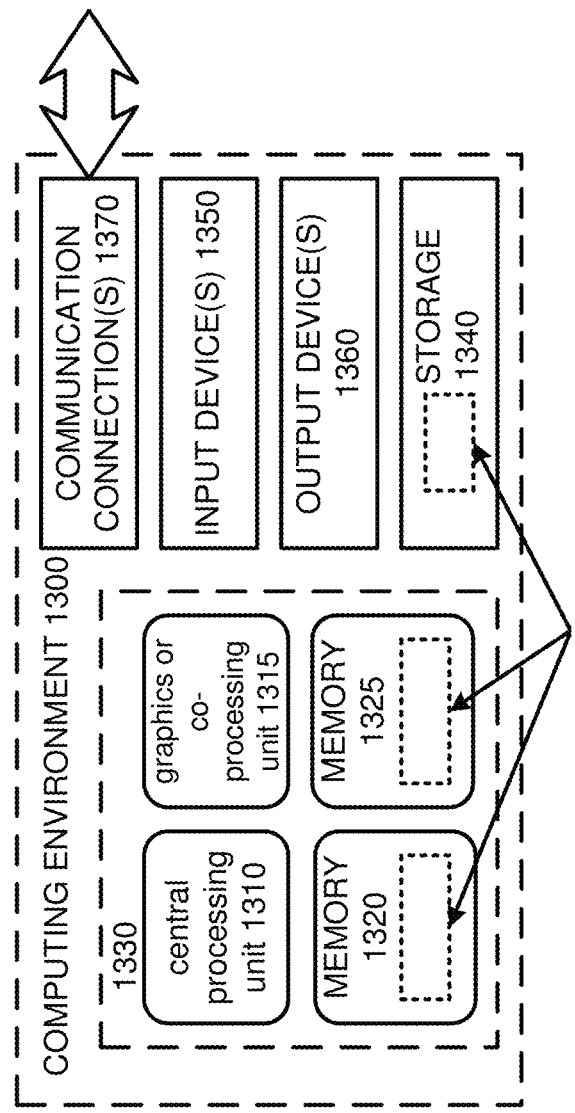
FIG. 13 is a diagram of an example computing system in which some described embodiments can be implemented.

FIG. 13 depicts a generalized example of a suitable computing system 1300 in which the described innovations may be implemented. The computing system 1300 is not intended to suggest any limitation as to scope of use or functionality, as the innovations may be implemented in diverse general-purpose or special-purpose computing systems.

With reference to FIG. 13, the computing system 1300 includes one or more processing units 1310, 1315 and memory 1320, 1325. In FIG. 13, this basic configuration 1330 is included within a dashed line. The processing units 1310, 1315 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 13 shows a central processing unit 1310 as well as a graphics processing unit or co-processing unit 1315. The tangible memory 1320, 1325 may be volatile memory (e.g., registers, cache, RAM), nonvolatile memory (e.g., ROM, EEPROM, flash memory, etc.), or some combination of the two, accessible by the processing unit(s). The memory 1320, 1325 stores software 1380 implementing one or more innovations described herein, in the form of computer-executable instructions suitable for execution by the processing unit(s).

A computing system may have additional features. For example, the computing system 1300 includes storage 1340, one or more input devices 1350, one or more output devices 1360, and one or more communication connections 1370. An interconnection mechanism (not shown) such as a bus, controller, or network interconnects the components of the computing system 1300. Typically, operating system software provides an operating environment for other software executing in the computing system 1300, and coordinates activities of the components of the computing system 1300.

The tangible storage 1340 may be removable or non-removable, and includes magnetic disks, magnetic tapes or cassettes, CD-ROMs, DVDs, or any other medium which can be used to store information and which can be accessed within the computing system 1300. The storage 1340 stores instructions for the software 1380 implementing one or more innovations described herein.

The input device(s) 1350 may be a touch input device such as a keyboard, mouse, pen, or trackball, a voice input device, a scanning device, or another device that provides input to the computing system 1300. For video encoding, the input device(s) 1350 may be a camera, video card, TV tuner card, or similar device that accepts video input in analog or digital form, or a CD-ROM or CD-RW that reads video samples into the computing system 1300. The output device (s) 1360 may be a display, printer, speaker, CD-writer, or another device that provides output from the computing system 1300.

The communication connection(s) 1370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computer device. In general, a computing system or computer device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into one or more programs, such as one or more lines of code in one or more larger programs, or a general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Mobile Device

Figure 14:
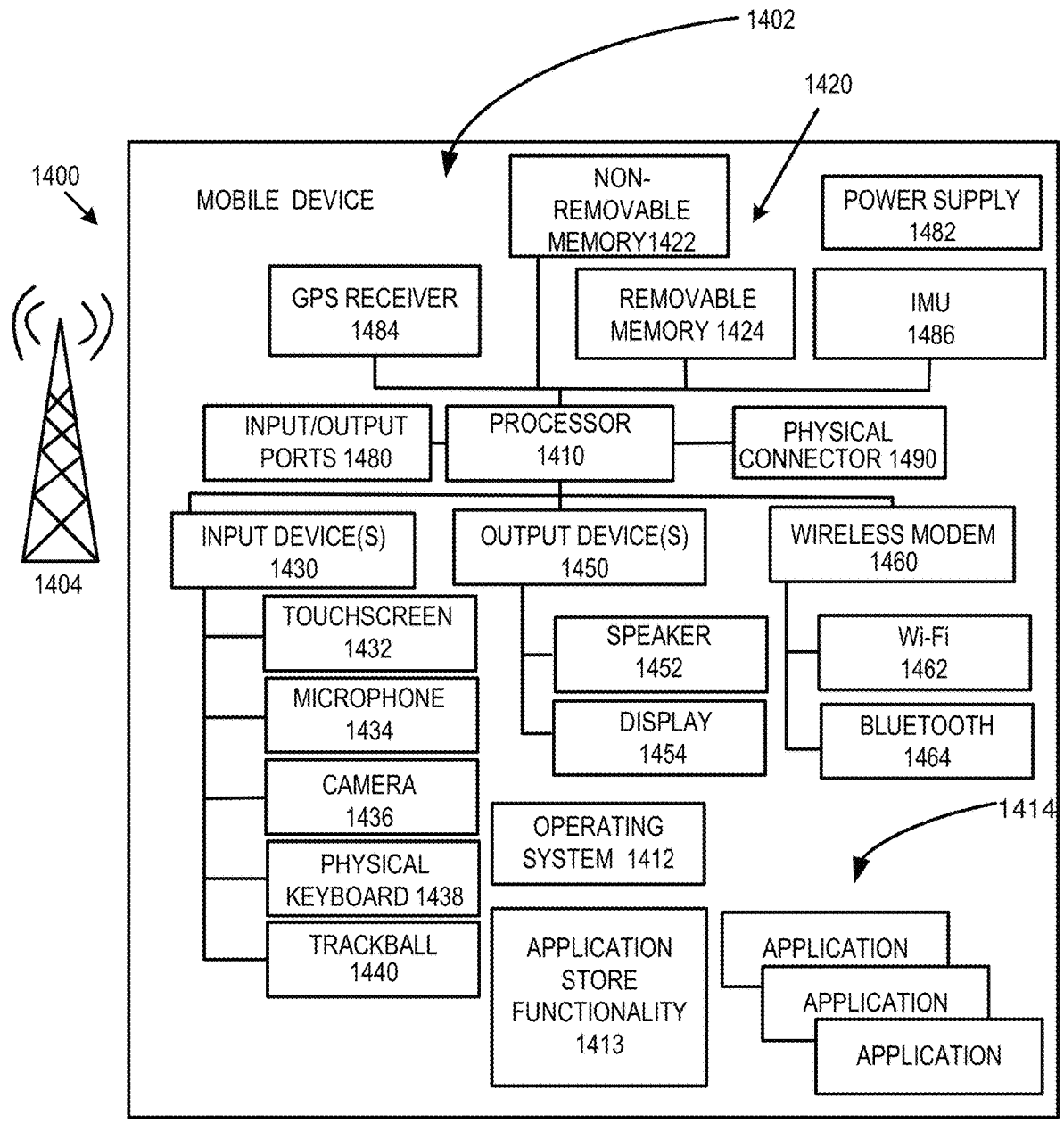
FIG. 14 is an example mobile device that can be used in conjunction with the technologies described herein.

FIG. 14 is a system diagram depicting an example mobile device 1400 including a variety of optional hardware and software components, shown generally at 1402. Any components 1402 in the mobile device can communicate with any other component, although not all connections are shown, for ease of illustration. The mobile device can be any of a variety of computer devices (e.g., cell phone, smartphone, handheld computer, Personal Digital Assistant (PDA), etc.) and can allow wireless two-way communications with one or more mobile communications networks 1404, such as a cellular, satellite, or other network.

The illustrated mobile device 1400 can include a controller or processor 1410 (e.g., signal processor, microprocessor, ASIC, or other control and processing logic circuitry) for performing such tasks as signal coding, data processing, input/output processing, power control, and/or other functions. An operating system 1412 can control the allocation and usage of the components 1402 and support for one or more application programs 1414. The application programs can include common mobile computing applications (e.g., email applications, calendars, contact managers, web browsers, messaging applications), or any other computing application. Functionality 1413 for accessing an application store can also be used for acquiring and updating application programs 1414.

The illustrated mobile device 1400 can include memory 1420. Memory 1420 can include non-removable memory 1422 and/or removable memory 1424. The non-removable memory 1422 can include RAM, ROM, flash memory, a hard disk, or other well-known memory storage technologies. The removable memory 1424 can include flash memory or a Subscriber Identity Module (SIM) card, which is well known in GSM communication systems, or other well-known memory storage technologies, such as "smart cards." The memory 1420 can be used for storing data and/or code for running the operating system 1412 and the applications 1414. Example data can include web pages, text, images, sound files, video data, or other data sets to be sent to and/or received from one or more network servers or other devices via one or more wired or wireless networks. The memory 1420 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 1400 can support one or more input devices 1430, such as a touchscreen 1432, microphone 1434, camera 1436, physical keyboard 1438 and/or trackball 1440 and one or more output devices 1450, such as a speaker 1452 and a display 1454. Other possible output devices (not shown) can include piezoelectric or other haptic output devices. Some devices can serve more than one input/output function. For example, touchscreen 1432 and display 1454 can be combined in a single input/output device.

The input devices 1430 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 1412 or applications 1414 can comprise speech-recognition software as part of a voice user interface that allows a user to operate the device 1400 via voice commands. Further, the device 1400 can comprise input devices and software that allows for user interaction via a user's spatial gestures, such as detecting and interpreting gestures to provide input to a gaming application.

A wireless modem 1460 can be coupled to an antenna (not shown) and can support two-way communications between the processor 1410 and external devices, as is well understood in the art. The modem 1460 is shown generically and can include a cellular modem for communicating with the mobile communication network 1404 and/or other radio-based modems (e.g., Bluetooth 1464 or Wi-Fi 1462). The wireless modem 1460 is typically configured for communication with one or more cellular networks, such as a GSM network for data and voice communications within a single cellular network, between cellular networks, or between the mobile device and a public switched telephone network (PSTN).

The mobile device can further include at least one input/output port 1480, a power supply 1482, a satellite navigation system receiver 1484, such as a Global Positioning System (GPS) receiver, an inertial measurement unit (IMU) 1486 (or one or more components thereof, such as a magnetometer, an accelerometer, or a gyroscope, or similar types of sensors), and/or a physical connector 1490, which can be a USB port, IEEE 1394 (FireWire) port, and/or RS-232 port. The illustrated components 1402 are not required or all-inclusive, as any components can be deleted and other components can be added.

Cloud-Supported Environment

Figure 15:
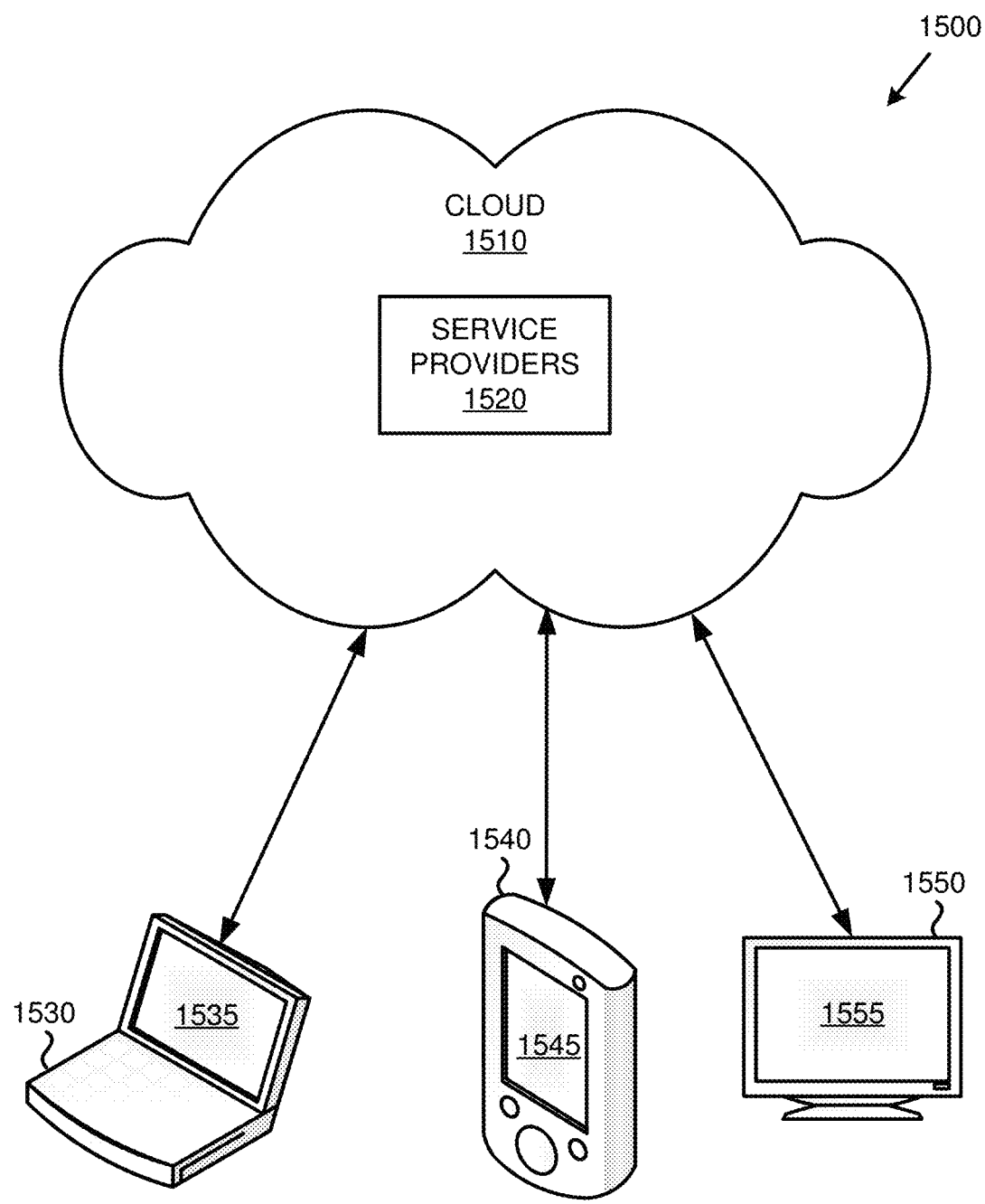
FIG. 15 is an example cloud-support environment that can be used in conjunction with the technologies described herein.

FIG. 15 illustrates a generalized example of a suitable cloud-supported environment 1500 in which described embodiments, techniques, and technologies may be implemented. In the example environment 1500, various types of services (e.g., computing services) are provided by a cloud 1510 (e.g., network 322 of FIG. 3). For example, the cloud 1510 can comprise a collection of computer devices, which may be located centrally or distributed, that provide cloud-based services to various types of users and devices connected via a network such as the Internet. The implementation environment 1500 can be used in different ways to accomplish computing tasks. For example, some tasks (e.g., processing user input and presenting a user interface) can be performed on local computer devices (e.g., connected devices 1530, 1540, 1550, which can correspond to the computer devices 304 of FIG. 3) while other tasks (e.g., storage of data to be used in subsequent processing) can be performed in the cloud 1510.

In example environment 1500, the cloud 1510 provides services for connected devices 1530, 1540, 1550 with a variety of screen capabilities. Connected device 1530 represents a device with a computer screen 1535 (e.g., a mid-size screen). For example, connected device 1530 could be a personal computer such as desktop computer, laptop, notebook, netbook, or the like. Connected device 1540 represents a device with a mobile device screen 1545 (e.g., a small size screen). For example, connected device 1540 could be a mobile phone, smart phone, personal digital assistant, tablet computer, and the like.

Connected device 1550 represents a device with a large screen 1555. For example, connected device 1550 could be a television screen (e.g., a smart television) or another device connected to a television (e.g., a set-top box or game console) or the like.

One or more of the connected devices 1530, 1540, 1550 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1500. For example, the cloud 1510 can provide services for one or more computers (e.g., server computers) without displays.

Services can be provided by the cloud 1510 through service providers 1520, or through other providers of online services (not depicted). For example, cloud services can be customized to the screen size, display capability, and/or touchscreen capability of a particular connected device (e.g., connected devices 1530, 1540, 1550).

In example environment 1500, the cloud 1510 provides the technologies and solutions described herein to the various connected devices 1530, 1540, 1550 using, at least in part, the service providers 1520. For example, the service providers 1520 can provide a centralized solution for various cloud-based services. The service providers 1520 can manage service subscriptions for users and/or devices (e.g., for the connected devices 1530, 1540, 1550 and/or their respective users).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computer device (i.e., any available computer device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 13, computer-readable storage media include memory 1320 and 1325, and storage 1340. By way of example and with reference to FIG. 13, computer-readable storage media include memory and storage 1320, 1322, and 1324. The term computer-readable storage media does not include signals and carrier waves. In addition, the term computer-readable storage media does not include communication connections, such as 1370, 1360, 1362, and 1364.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

What is claimed is:

1. A computer device for controlling data presented to a user, the computer device comprising:
    a processing unit; and
    a memory, wherein the computing device, via computer-executable instructions, perform operations for creating a task record useable to control task and activity information displayed to a user, the operations comprising:
        receiving activity data for a plurality of user activities, wherein each activity associated with a software application, and wherein the activity data for each of the plurality of user activities comprising an activity identifier, an application identifier for the software application, and a content identifier;
        storing the activity data for the plurality of user activities in a data structure;
        receiving user input associating one or more of the plurality of user activities with a task record, wherein the task record comprising a task identifier and the activity identifier of each of the associated one or more of the plurality of the user activities;
        associating the one or more of the plurality of the user activities with the task record in response to the user input;
        storing the task record in a data structure;
        monitoring a first user activity associated with one or more software applications associated with a respective activity identifier in the task record;
        monitoring a second user activity associated with one or more software applications not associated with an activity identifier in the task record, wherein the second monitored user activity carried out in temporal proximity to the first user activity; and
        suggesting, by an activity engine, to a user to add to the task record at least one activity identifier for an activity associated with the second monitored user activity.

2. The computer device of claim 1, wherein at least one of the plurality of activities is associated with a software application that is a word processor, a web browser, a communications program, or a video player.

3. The computer device of claim 1, the operations further comprising:
    receiving user input selecting the task record;
    retrieving the task record from the data structure; and
    causing at least one of the one or more applications to be executed in response to the user input.

4. The computer device of claim 3, wherein causing the at least one of the one or more applications to be executed comprising sending a command to another computer device to execute the application on the another computer device.

5. The computer device of claim 1, the operations further comprising:
    receiving a task record from another computer device;
    analyzing the task record to determine if content associated with one or more activities of the task record are present on the another computer device; and
    downloading content associated with at least one of the one or more activities.

6. The computer device of claim 1, the operations further comprising:
    receiving a task record from another computer device;
    analyzing the task record to determine if a software application associated with one or more activities of the task record are present on the another computer device; and
    downloading the software application if the software application is not installed on the another computer device.

7. The computer device of claim 1, the operations further comprising:
    receiving a navigational mnemonic;
    storing the navigational mnemonic in a data structure, the navigational mnemonic comprising an identifier; and
    storing the navigational mnemonic identifier in the task record.

8. The computer device of claim 1, the operations further comprising:
    rendering for output to a buffer a display comprising information associated with the task record, the information comprising activities associated with the task record.

9. The computer device of claim 8, wherein the display comprises a window of a graphical user interface associated with the task record, the window comprising tabs for at least a portion of applications associated with the task record.

10. The computer device of claim 9, wherein the at least a portion of application comprises executing applications.

11. The computer device of claim 8, wherein the display comprises stacked representations of activities associated with the task record.

12. A non-transitory computer-readable storage medium storing computer-executable instructions for creating a task record for one or more user activities, the operations comprising:
    receiving activity data for a plurality of user activities, wherein each activity associated with a software application, and wherein the activity data for each of the plurality of user activities comprising an activity identifier, an application identifier for the software application, and a content identifier;
    storing the activity data for the plurality of user activities in a data structure;
    receiving user input associating one or more of the plurality of user activities with a task record, wherein the task record comprising a task identifier and the activity identifier of each of the associated one or more of the plurality of the user activities;

associating the one or more of the plurality of the user activities with the task record in response to the user input; storing the task record in a data structure;

monitoring a first user activity associated with one or more software applications associated with a respective activity identifier in the task record;

monitoring a second user activity associated with one or more software applications not associated with an activity identifier in the task record, wherein the second monitored user activity carried out in temporal proximity to the first user activity; and suggesting, by an activity engine, to a user to add to the task record at least one activity identifier for an activity associated with the second monitored user activity.

13. A method, implemented by a computer device, for creating a task record for one or more user activities, the method comprising:

receiving activity data for a plurality of user activities, wherein each activity associated with a software application, and wherein the activity data for each of the plurality of user activities comprising an activity identifier, an application identifier for the software application, and a content identifier;

storing the activity data for the plurality of user activities in a data structure;

receiving user input associating one or more of the plurality of user activities with a task record, wherein the task record comprising a task identifier and the activity identifier of each of the associated one or more of the plurality of the user activities;

associating the one or more of the plurality of the user activities with the task record in response to the user input;

storing the task record in a data structure;

monitoring a first user activity associated with one or more software applications associated with a respective activity identifier in the task record;

monitoring a second user activity associated with one or more software applications not associated with an activity identifier in the task record, wherein the second monitored user activity carried out in temporal proximity to the first user activity; and suggesting, by an activity engine, to a user to add to the task record at least one activity identifier for an activity associated with the second monitored user activity.

* * * * *